United States Patent
Isobe et al.

(10) Patent No.: US 6,636,813 B1
(45) Date of Patent: Oct. 21, 2003

(54) SERVICE LIFE MANAGEMENT SYSTEM FOR HIGH-TEMPERATURE PART OF GAS TURBINE

(75) Inventors: Nobuhiro Isobe, Hitachi (JP); Yasushi Hayasaka, Mito (JP); Shigeo Sakurai, Hitachi (JP); Kunihiro Ichikawa, Hitachi (JP)

(73) Assignee: Hitchi, Ltd., Tokyo (JP)

( * ) Notice: Subject to any disclaimer, the term of this patent is extended or adjusted under 35 U.S.C. 154(b) by 0 days.

(21) Appl. No.: 09/913,957

(22) PCT Filed: Sep. 27, 1999

(86) PCT No.: PCT/JP99/05248

§ 371 (c)(1),
(2), (4) Date: Nov. 15, 2001

(87) PCT Pub. No.: WO01/23725

PCT Pub. Date: Apr. 5, 2001

(51) Int. Cl.[7] .................. F01D 9/02; F02C 7/00
(52) U.S. Cl. ............ 702/34; 702/187; 702/184; 200/79
(58) Field of Search .............. 702/34, 83, 84, 702/184, 187; 703/7, 6, 13, 18; 700/79; 356/237.1; 348/128

(56) References Cited

U.S. PATENT DOCUMENTS 4,875,170 A * 10/1989 Sakurai et al. .......... 702/34
5,027,268 A * 6/1991 Sakurai et al. .......... 700/79
6,226,597 B1 * 5/2001 Eastman et al. ......... 702/34

FOREIGN PATENT DOCUMENTS

| JP | 4-27127 | 3/1992 |
| JP | 4-355338 | 12/1992 |
| JP | 5-81502 | 4/1993 |
| JP | 6-257412 | 9/1994 |
| JP | 10-196403 | 7/1998 |
| JP | 10-293049 | 11/1998 |
| JP | 11-141352 | 5/1999 |

* cited by examiner

*Primary Examiner*—Kamini Shah
(74) *Attorney, Agent, or Firm*—Mattingly, Stanger & Malur P.C.

(57) ABSTRACT

A life management system for high-temperature parts of a gas turbine has one server system 3 and a plurality of client systems 5a, 5b, 5c, and 5d, all of which are connected via an Intranet. Further, the server system 3 manages a program for performing evaluation of the remaining life and the life management, and each of the client systems 5a, 5b, 5c, and 5d has a subprogram for accessing the database 4 and for entering data respectively. The clients are dedicated to different objects and share respective element data such as real component damage, design, materials, etc. which are necessary for the evaluation of the remaining life. Further, this system enables the operation of the gas turbine to be optimized based on the damage of the evaluated parts, hence contributing to operational cost reduction of the gas turbine.

11 Claims, 23 Drawing Sheets

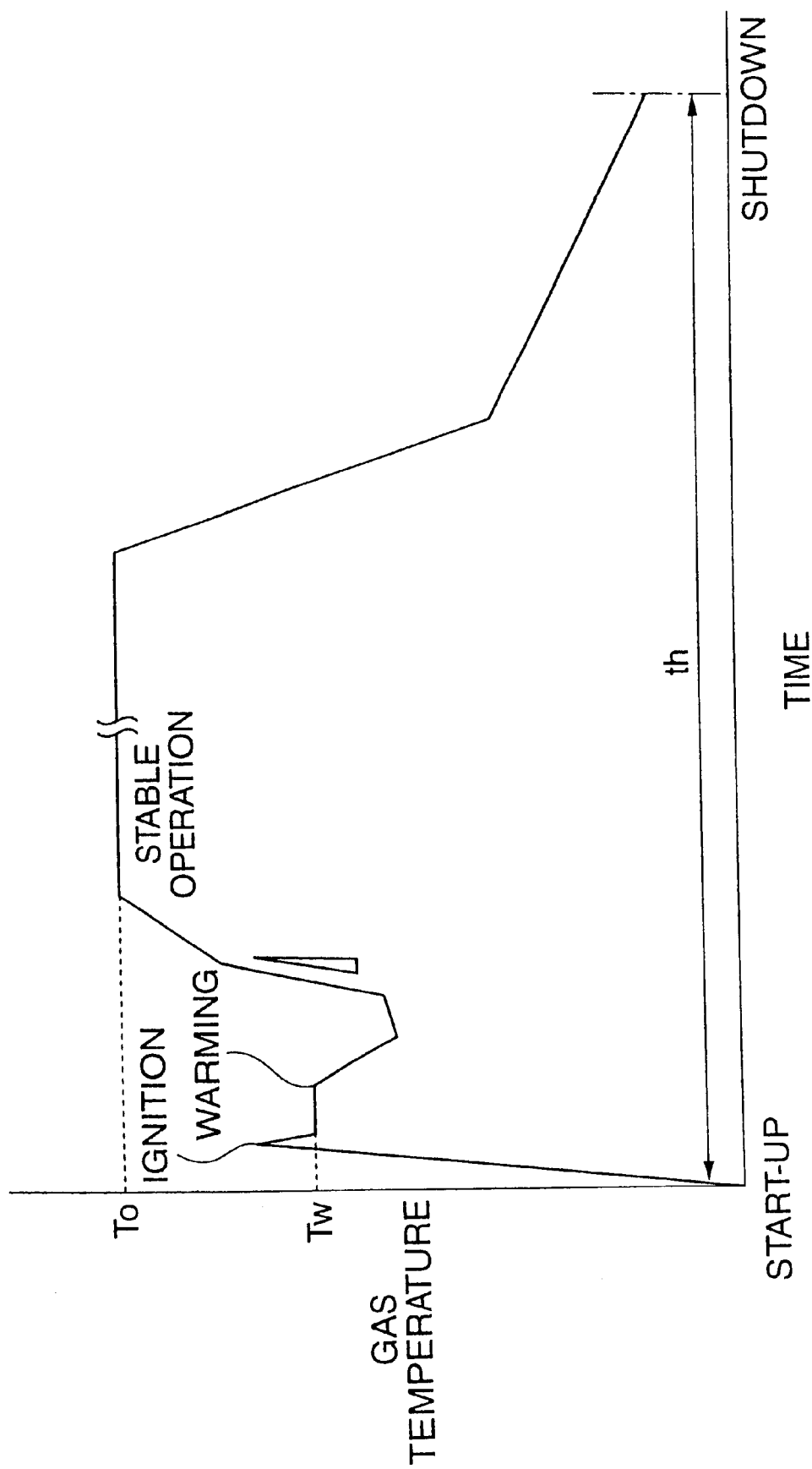

- ● NORMAL START-UP
- △ WARMING TEMPERATURE DECREASED BY 5%
- ○ WARMING TEMPERATURE DECREASED BY 10%

REPAIRING

NUMBER OF START-UPS AND SHUTDOWNS

SERVICE LIFE MANAGEMENT SYSTEM FOR HIGH-TEMPERATURE PART OF GAS TURBINE

TECHNICAL FIELD

The present invention relates to a life management system for parts comprising a gas turbine that reach a high temperature when in use due to the combustion gas of very high temperature thereof (hereinafter referred to simply as "high-temperature parts").

BACKGROUND ART

A combustor, nozzle blades, etc., which are the high-temperature parts of the gas turbine, are located in a channel of the combustion gas of a very high temperature, and therefore may suffer damages, such as thermal fatigue cracking creep deformation etc. which break out due to thermal strain induced repeatedly in connection with start-ups and shutdowns of the gas turbine and a high-temperature environment during its steady operation. A gas turbine power-generating unit in which electric power is generated by driving a power generator with rotational output of the gas turbine has merit of an excellent operability compared to other power-generating units.

Therefore, the gas turbine power-generating unit is imposed with severe operating conditions such as Daily Start-up and Shutdown (DSS) and Weekly Start-up and Shutdown (WSS). Operations, such as these DSS and WSS, where the number of start-ups and shutdowns reaches a large value are employed frequently. Especially, because the high-temperature parts of the gas turbine are used under extremely severe conditions, heat-resistant superalloys of nickel base or cobalt base are used for these parts. Although being superalloys, such high-temperature parts are used under conditions close to their critical temperatures, and that there is a variation in operating conditions as described above. Consequently, these parts are likely to suffer damages considerably earlier than other parts.

Therefore, when putting the gas turbine into operation, it is periodically suspended, parts including the high-temperature parts etc. are inspected for the damages, and if necessary a part is repaired or replaced. However, since these parts are made of expensive superalloys, costs required to perform their repairing and replacement inevitably occupy a considerable portion of an overall operational cost. In order to reduce the operational costs, it is important to improve the accuracy of evaluation of remaining lives of these parts and hence aim at rationalizing any standards for repairing and replacement.

Regarding techniques for evaluating the remaining life of the high-temperature parts, for example, in Japanese Published Unexamined Utility Model Application No. 4-27127, proposed are a method and its device for estimating thermal strain induced in members from measurement results of an exhausted combustion gas temperature and estimating their damage. For other methods, in Japanese Published Unexamined Patent Application No. 4-355338, proposed are a method and its device for evaluating the damages by taking in a crack initiation status of a member surface as an image and simulating crack growth using a certain probability model. Further, in Japanese Published Unexamined Patent Application No. 10-293049, proposed is a maintenance management device for the gas turbine that enables its maintenance by means of damage evaluation based on changes of microscopic structure, and crack growth prediction, etc.

In addition to these contrivances, used is a method wherein a sample is taken out of a part to be inspected and then imposed with a destructive test to estimate its damage, and the like. Further, in Japanese Published Unexamined Patent Application No. 10-196403, devised is a life management device for judging necessity of repairing and replacement of each part of the gas turbine based on management of actual data thereof and their evaluated lives and displaying the results.

In applying the above-described methods to a practical use, professional knowledge and design data such as materials data, results of structure analysis, etc. are necessary. Further, it is also important to prolong a period required for these evaluations in order to reduce operational costs necessary for installation maintenance. Further, to improve the accuracy of the evaluation, it is also important to maintain a circumstance where comparison and referencing of damage data of the past can easily be conducted. To do so, it is necessary to construct a database with information comprising a base of the evaluation and put the database into operation. However there is few cases where such information is integrated so as to be served as an available database because a person who installed the gas turbine, person in charge of maintenance management, its designer, etc. are different to one another.

Owing to this, frequently it is likely to be a work requiring a considerable time in existing circumstances to prepare the damage data from results of inspection and evaluate the damage by referring to design data and material data. There is often the case where works necessary for performing, for example, preparation of material data necessary at time of designing, statistical analysis of real component damage data, review of design conditions based on it, etc. become complicated, because databases are not served in such an integrated form that allows various staff members to share information. To solve the difficulties, a remaining-life evaluation device and the life management device as described above have been proposed. However, respective factors in the evaluation, such as investigation of the damage data of a real component, damage analysis, selection of material data, etc. still require professional knowledge, and hence its effective operation is in a difficult situation.

In addition, although conventional methods enable an operator to obtain the damage and the remaining life of an object part, it is also an important task to optimize operation of the gas turbine based on the damage of a part evaluated, in order to reduce operational costs. To achieve this, results of the structure analysis when a loading pattern at time of start-up and shutdown is altered, material data under a condition where repairing is performed, etc. become necessary. However, with current methods, it is difficult to rapidly formulate both prediction of the damage and the remaining life when these conditions are altered and the optimization of operation of the gas turbine with intent to reduce the operational costs consistently.

DISCLOSURE OF THE INVENTION

Therefore, it is the object of the present invention to provide a system capable of rapidly performing the remaining-life management of the high-temperature parts of the gas turbine.

In the present invention, a remaining-life management system for high-temperature parts of the gas turbine is constructed that is capable of using an Intranet and working in that environment.

That is, the remaining-life management system comprises one server system and a plurality of other client systems, wherein the server system manages a program for performing the evaluation of the remaining life and the life management, and each client system has a subprogram for accessing the main database of the server system and entering data thereto.

Further, the remaining-life management system employs such a scheme that the results of the structure analysis under conditions where a load variation pattern of start-up and shutdown is altered and life data of repaired members are saved in a database belonging to the client system dedicated to handling these specially, and any data necessary for the life management are transferred to the server system.

Furthermore, a system configuration of a client-server system is adopted that enables an organic combination of the damage database such as results of regular inspection etc., a structure analysis database, a materials database, etc. so that analytical evaluation of an inverse problem which is necessary to examine a life extending structure can be performed rapidly using real component field data.

The life management is performed based on the evaluation of damage growth such as a crack in each part. In evaluating the crack growth, it is necessary to set several operating parameters such as the combustion gas temperature, the warming temperature, and the operating time for one start-up and shutdown, etc. When these parameters change, stress and strain induced in the members change, and hence the damage growth rate also changes.

If change of the stress etc. due to the change of an operating parameter is analyzed one by one and the life is evaluated based on the results, it takes a considerable amount of time. To circumvent this problem, the damage growth is evaluated beforehand under a condition where each operating parameter is altered and a relationship between the damage growth rate and the amount of alteration of each operating parameter is found, respectively. From those relationships, a rate of change of the damage growth rate when each operating parameter is altered is obtained as an acceleration coefficient or index as compared to that of standard conditions. Using the acceleration coefficients or indexes enable damage growth analysis under arbitrary conditions to be performed rapidly.

Furthermore, the above-described acceleration coefficients are set based on results of the damage analysis using the stress and strain that were found through the regression analysis of data obtained at a regular inspection of the real component or through the structure analysis under conditions with altered operating parameters beforehand.

Using the above damage growth analysis, it is evaluated whether operating parameters can be altered so that the damage growth rate is lowered so much as to enable the period of repairing and replacement to be extended and whether an economic effect can be obtained through that alteration. In addition, change of the damage growth rate due to repairing and coating application is also evaluated and stored, as is the case with the above-described acceleration coefficients. By performing the above-described damage growth analysis plural times, alteration of a time of repairing, a repairing method, a time of coating application, or a time of inspection that can give the largest economic effect are judged and displayed within the limit of a predetermined operation program (i.e. operational mode such as DSS and WSS, a time of inspection, etc.).

By the way, when evaluating the effect of coating, in order to consider the thermal shield effect of coating, a relationship between the stress and strain obtained in the structure analysis under conditions where the heat transfer coefficient of a member surface is changed and the life of the member depending upon thermal boundary conditions obtained from the damage growth analysis, which were stored beforehand, are used.

The evaluation of the damage growth is performed for each part. Results of evaluation for each part is shown on an arrangement drawing of each part. Thus, a person in charge of device management now can grasp damage situation of each part easily.

BRIEF DESCRIPTION OF THE DRAWINGS

FIG. 5 is a graph showing the combustion gas temperature of the gas turbine versus time from its start-up to shutdown.

BEST MODE FOR CARRYING OUT THE INVENTION

Figure 1:
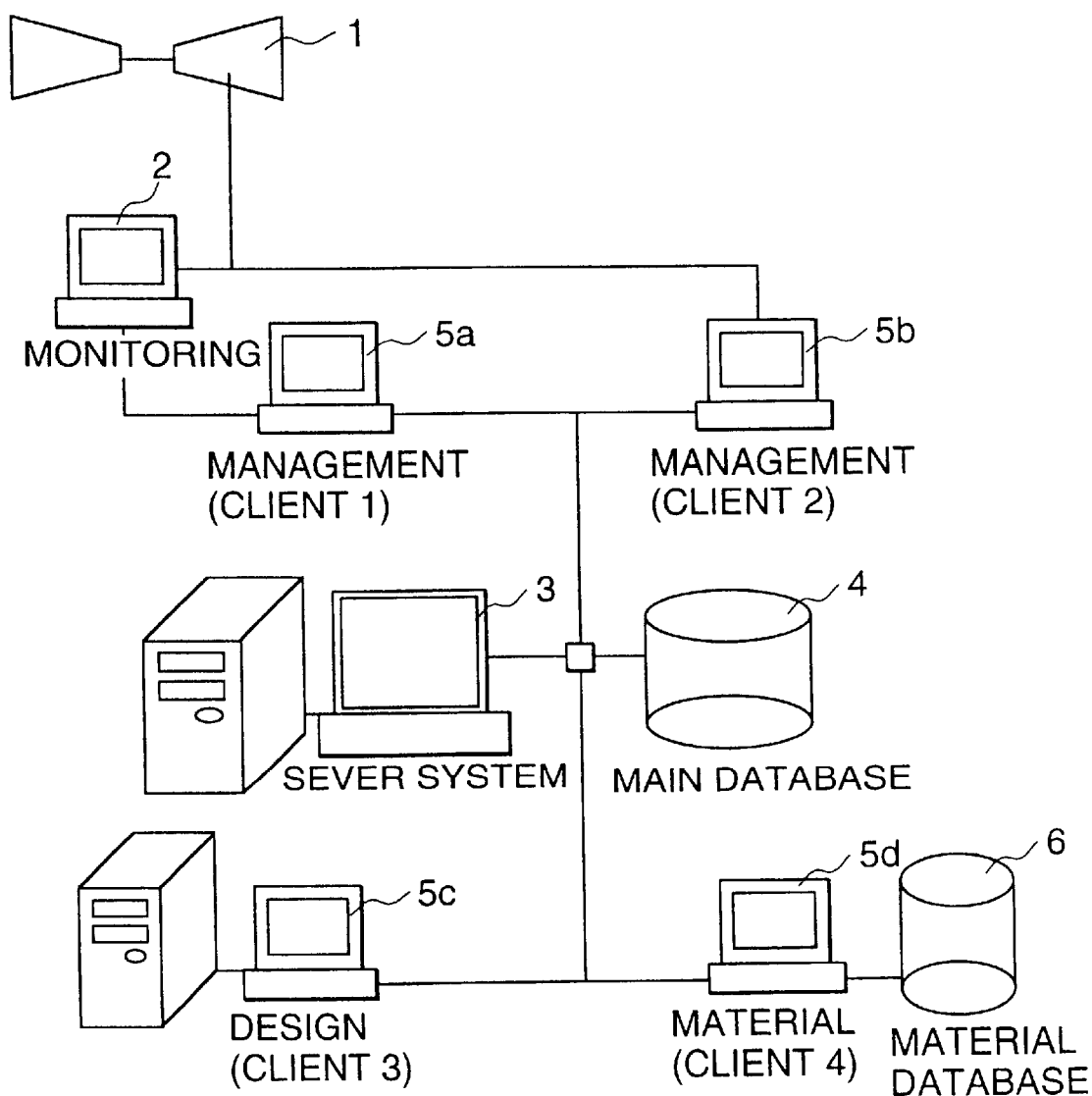
FIG. 1 is a diagram showing a configuration of the remaining-life management system according to the present invention.

FIG. 1 shows a configuration diagram of the life management system of the gas turbine 1 for a gas turbine power-generating unit. A server system 3 acting as a main component of the present system and a main database 4 are located in the center of a network and a plurality of client systems 5a, 5b, 5c, and 5d and the server system 3 are connected in a manner of the network connection. Each of the client systems 5a, 5b, 5c, and 5d has a browser for accessing the server system 3 as well as a computer and a database in compliance with each objective.

For example, the client system 5a used for operations management collects data concerning operating states of the gas turbine 1 from the monitoring device 2, transfers necessary data to the server system 3 via its browser and receives results of evaluation of the remaining life corresponding thereto and an optimal system operation schedule from the server system 3.

At the client system 5b dedicated to the maintenance, the damage data of each member obtained at time of regular inspection are entered thereto, these damage data being exchanged with the server system 3, and judgments concerning the evaluation of the remaining life of parts and their repairing and replacement are performed. The evaluation of the remaining life is done using the following two methods at the same time: (1) an inductive evaluation method wherein a tendency analysis of the damage growth is performed through analytical processing etc. using the damage data of members of the past; and (2) a deductive evaluation method wherein the stress and strain exerting on the members are evaluated through the structure analysis etc. based on the design conditions and operations data, and based on these results, the crack growth analysis is performed by means of, for example, the fracture mechanics and the like.

In the latter, the deductive evaluation, necessary design conditions and material data are transferred from each of the client systems 5c, 5d to the main database 4 and the evaluation is performed there, and at the same time, data processing based on the real component damage data etc. with intent to review the design conditions can also be performed. For example, in a thermal stress analysis of the high-temperature parts, thermal boundary conditions (i.e. environmental temperature, the thermal conductivity, etc.) are reviewed so that the results of analysis become similar to a damage distribution of the real component.

In that occasion, results of damage investigation such as a cracking situation etc. of a certain part, namely a position of crack generation and its length are schematically illustrated on a drawing of the part. Next, the drawing of the part is divided into a plurality of areas having a suitable size and a contour map of the damage is formed, each contour having the same amount of damage evaluated by using the data of cracking situation, and transferred to the client system 5c of a designer. An operator who reviews alteration of design conditions alters appropriately the design conditions such as its thermal boundary conditions, reviews calculation conditions so that results of the stress analysis come near to the above-described contour map, and reexamines the stress. Its results are transferred to the server system 3 and the remaining life is evaluated there.

Moreover, occasionally when the real component is inspected, a portion of a part is sampled as a specimen and inspected destructively, or without sampling a specimen, a part is inspected in a non-destructive manner, so that deterioration degree of the part is evaluated. The experimental results are entered to the materials client system 5d. By comparing the test results with data stored in the materials database 6, the remaining life of the part is evaluated, and the result is transferred to the server system 3.

Figure 2:
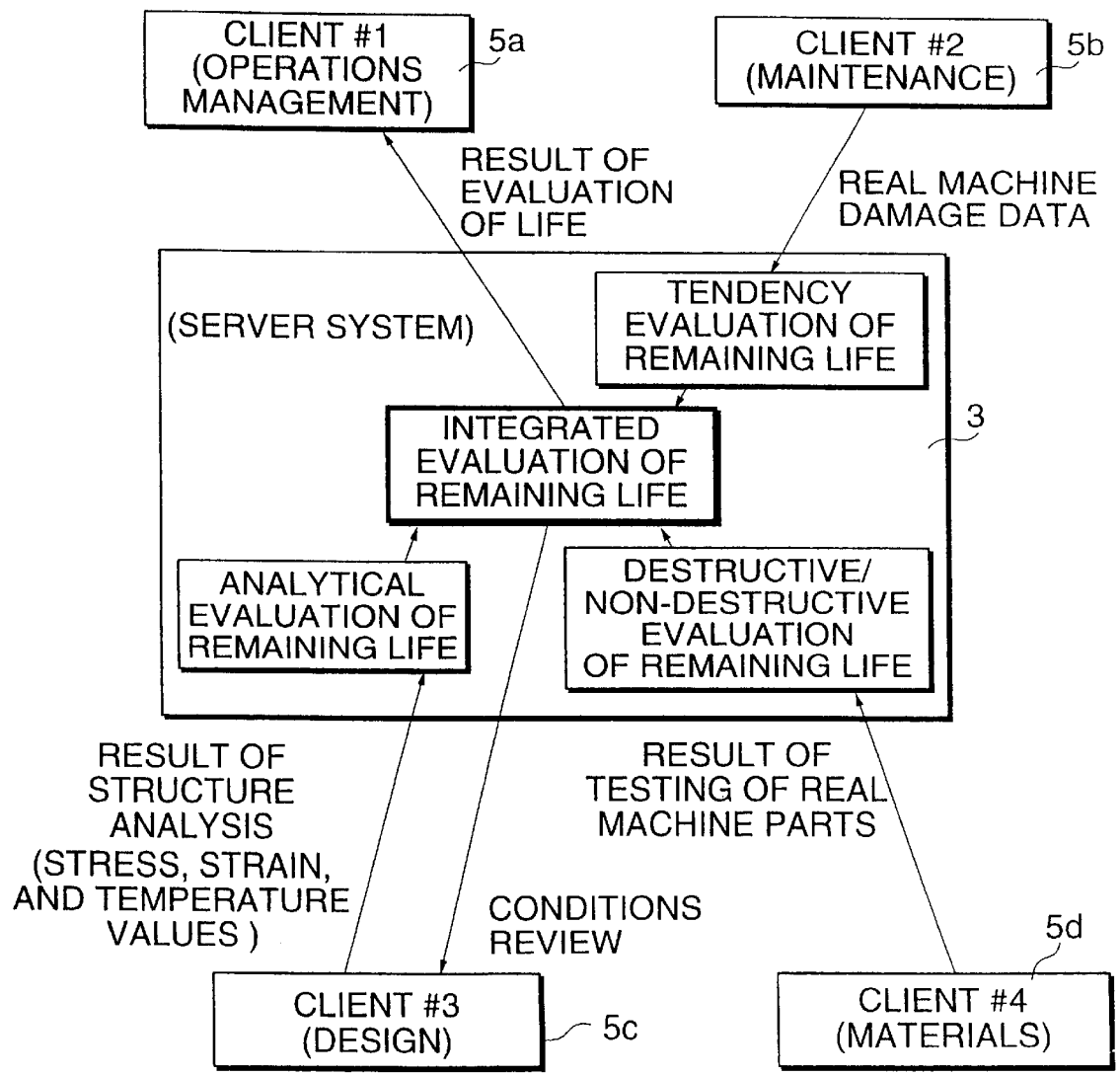
FIG. 2 is a diagram showing flows of data between the server system and client systems in the remaining-life management system according to the present invention.

In the present life management system, the above-described inductive evaluation method is called as tendency evaluation of the remaining life, the deductive evaluation method is called as analytical evaluation of the remaining life, and the evaluation method by means of destructive/non-destructive testing of the real component or its sampled member is called as destructive/non-destructive evaluation of the remaining life. Actual evaluation of the remaining life is performed by integrating these evaluation methods. FIG. 2 depicts data flows in the integrated evaluation of the remaining life. The damage growth is evaluated by both the tendency evaluation and the analytical evaluation of the remaining life. The tendency evaluation is performed in the server system 3 after the damage data of the real component were transferred from the client (#2) 5b to there. The analytical evaluation is also performed in the server system 3 after the results of the structure analysis were transferred from the client (#3) 5c to there. If there arises a difference between the results of both evaluation methods, the conditions of the structure analysis are reviewed by transferring data between the above-described client system 5c and the server system 3 and the analytical evaluation is recalculated.

Figure 3:
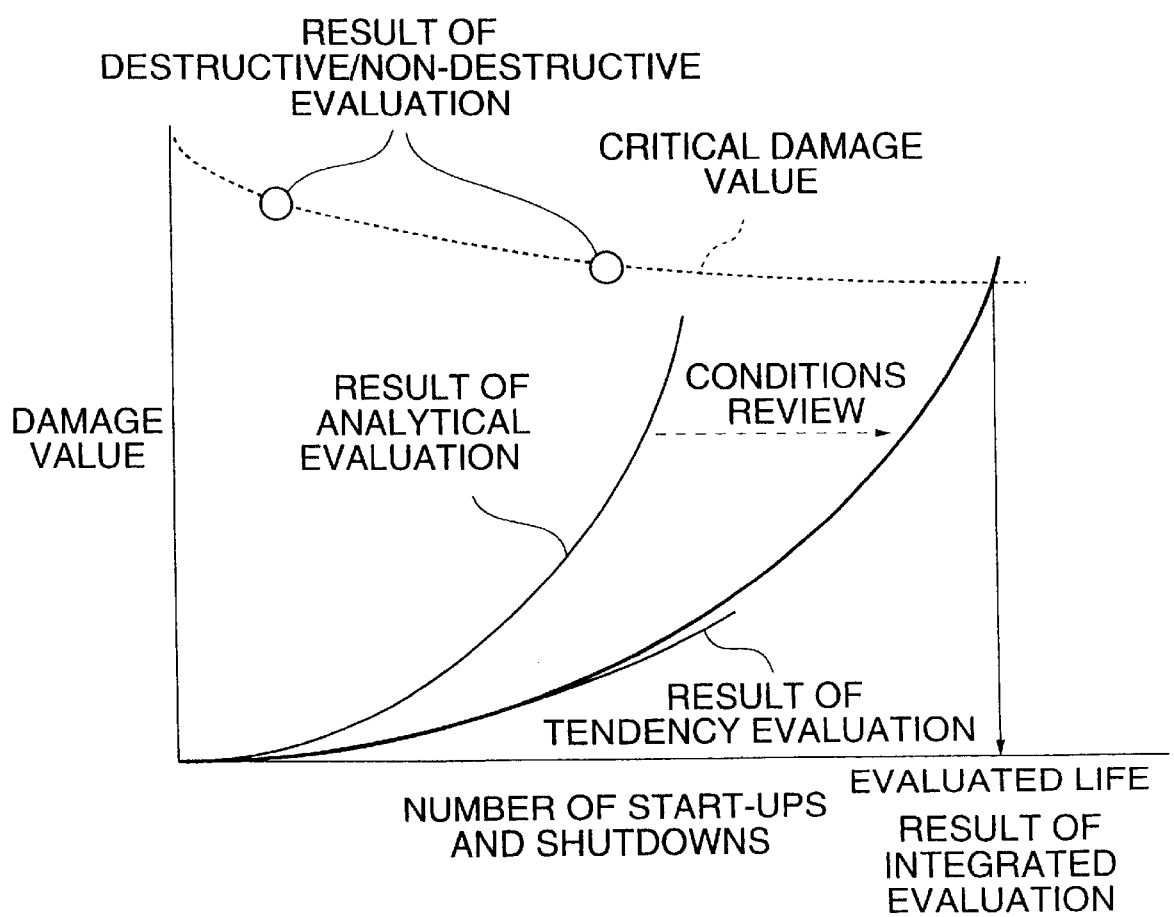
FIG. 3 is a diagram explaining a concept of an evaluation method that is used in an embodiment of the present invention, with the use of a graphical representation.

Through the above procedures, the evaluation of the damage growth is performed. In the destructive/non-destructive evaluation, the critical damage value is evaluated in the server system 3 based on the deterioration degree of the material evaluated by the client system 5d. Using these results, the integrated evaluation of the remaining life is performed and its results are transferred to the operations management client system 5a. An idea of this evaluation method is illustrated in FIG. 3 with the use of a graphical representation.

In the present life management system, the server system 3 should be a relatively large computer such as a work station; whereas the client systems 5a, 5b, 5c, and 5d are run by standard personal computers through Intranet connection, respectively, so that the client system can be operated without the need for special knowledge.

Figure 4:
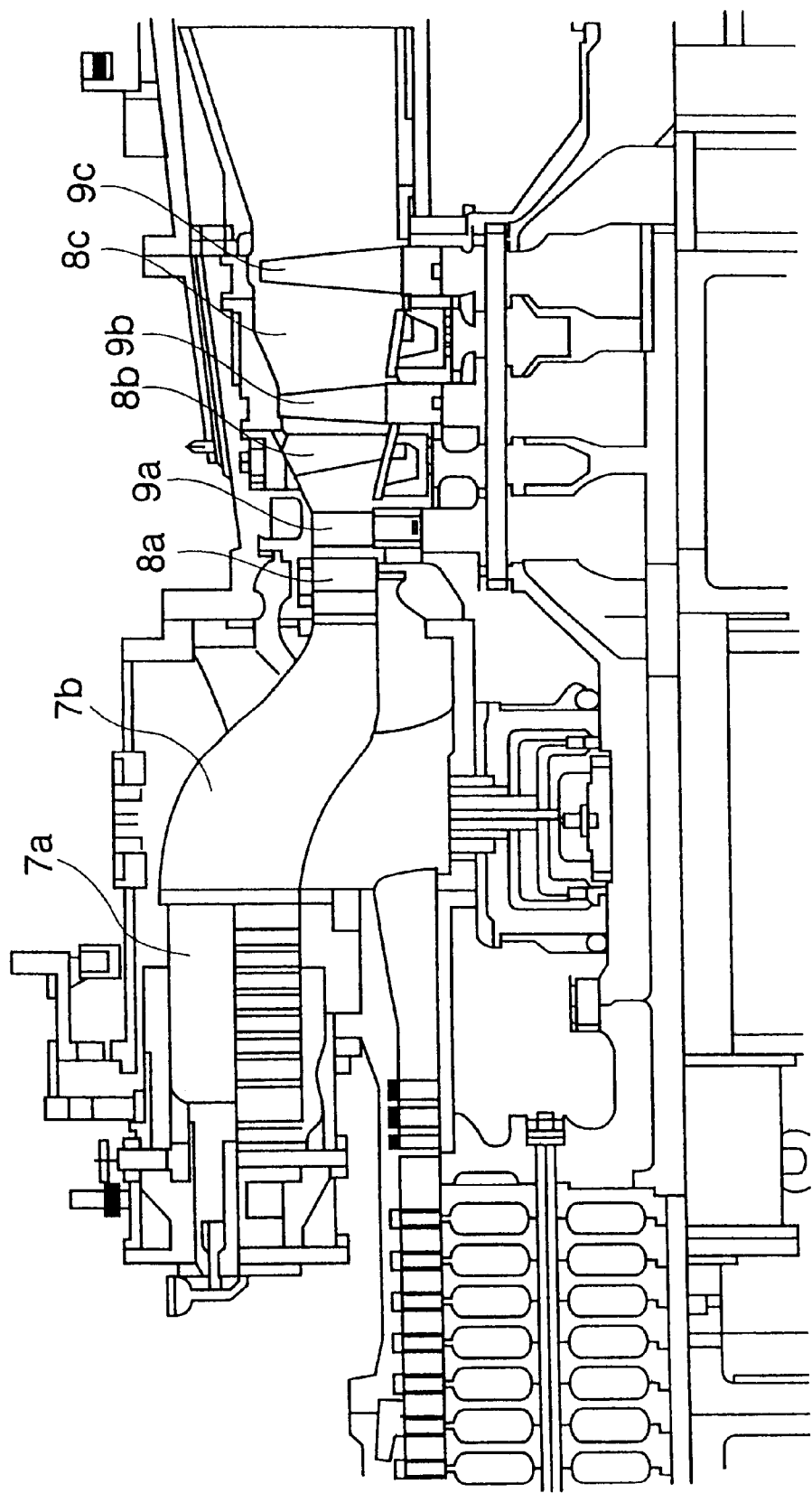
FIG. 4 is a cross sectional view of a substantial part of the gas turbine showing arrangement of high temperature parts of the gas turbine.

In the following, shown is an embodiment according to the present development with a special emphasis on the nozzles, namely high-temperature parts of the gas turbine. FIG. 4 is a schematic illustration showing a high-temperature gas channel of the gas turbine, where a combustor liner 7a, a combustor transition piece 7b, a first-stage nozzle 8a, a first-stage moving blade 9a, etc. are all high-temperature parts. Since the first-stage nozzle is located just after an exit of the combustor, that blade is a part exposed to a highest temperature in a turbine unit; there have been reported several cases where thermal fatigue cracks were generated on a surface of the first-stage nozzle due to thermal fatigue induced by temperature variation of the member in connection with the start-up and shutdown of the turbine.

Figure 6A:
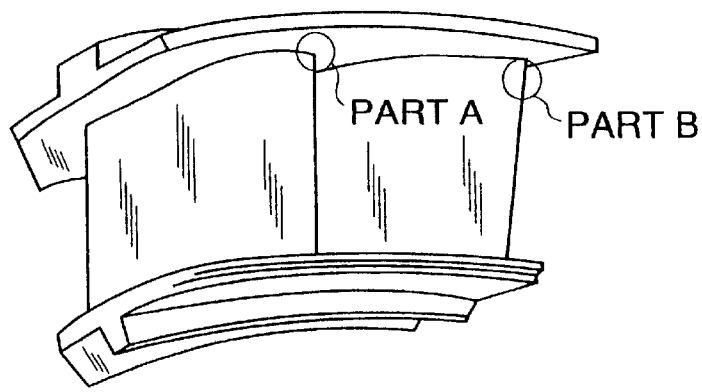
FIG. 6 are graphs showing relationships between characteristic curves of temperature-strain hystereses for part A and Part B on a first-stage nozzle of the gas turbine and locations of part A and part B.
Figure 6B:
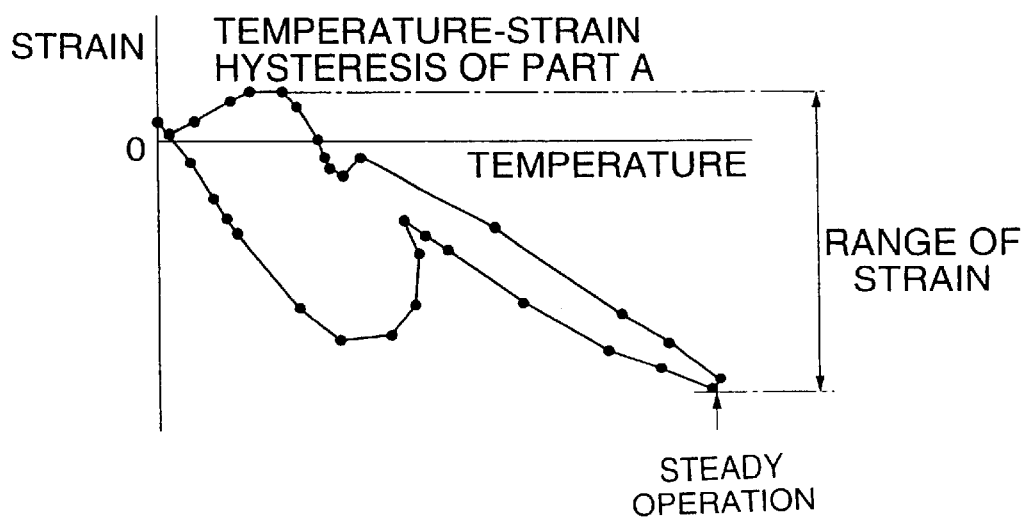
Figure 6C:
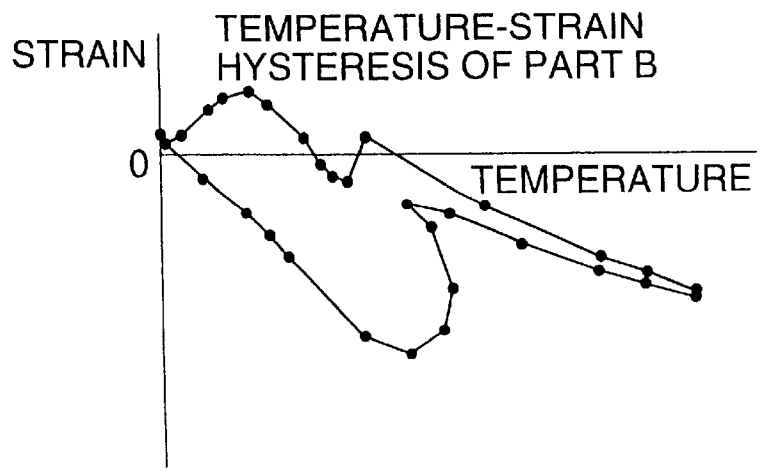

Because of this fact, the first-stage nozzles are being regularly repaired and regarded as parts associated with a high necessity of improving a remaining life extending technique and the life management. FIG. 5 is a diagram showing one example of variation pattern of the combustion gas temperature in connection with start-up and shutdown of the gas turbine. As an example of the thermal stress analysis of the first-stage nozzle of the gas turbine under this condition, the middle and bottom of FIG. 6 show a temperature-strain hysteresis of an end wall (part A) and that of blade trailing edge part (part B), respectively, of the first-stage nozzle of the gas turbine shown in the top of FIG. 6. In the above-described deductive method, the life of a member is evaluated using the result of this structure analysis. An example of the evaluation method is described in the following (1) and (2).

(1) As shown in FIG. 6, a strain range is calculated from the results of the structure analysis. A fatigue life $N_f$, a life when strain is repeatedly imposed on a member at the highest temperature in the cycle is obtained and its inverse $(1/N_f)$ is referred to as fatigue damage $D_f$.

Next, the stress and temperature in the steady operation are obtained. During this period, thermal stress generated in a period from the start-up to the steady operation is being retained and stress relaxation takes place through creeping. Behavior of the stress relaxation is estimated by a creep strain formula for the material and creep damage is computed by the following formula.

$$Dc = \int_{1cycle} \frac{1}{t_R(\sigma, T)} dt \quad \text{Equation 1}$$

Where $t_R$ is a creep rupture life, which varies depending on the operating stress and the temperature. These data are provided from the materials database and used for the evaluation. In practice, the creep damage $D_c$ per one start-up and shutdown is found as follows: a stress relaxation curve is obtained; a period of the steady operation is divided into micro intervals; the creep damage for each interval is obtained in the same form as that of the equation 1; and respective creep damages are summed up.

Summation of the fatigue damage and the creep damage both thus obtained is a damage value for one start-up and shutdown, and the number of start-ups and shutdowns at which the damage value reaches an upper limit value that was separately given is judged to be the life of the member. Here, the upper limit value is generally determined based on the life of a specimen obtained experimentally and it corresponds to a crack generation life during which the crack develops comparable to the diameter of the specimen. However, in the gas turbine nozzle, it is often the case that cracks longer than the above-described diameter may be allowed, and therefore the above method tends to bring about excessively conservative evaluation.

(2) An appropriate initial crack length is set and the fracture mechanics parameters (such as a range of cyclic J-integral, a range of stress intensity factor, etc.) are computed. Since calculating formula for calculating fracture mechanics parameters have different forms according to shapes of members, modeling techniques for cracks, etc., calculating programs corresponding to several typical models are being stored in the system. Here, suppose that, for example, an iterative integration $J_f$ is computed by one of the programs. Then, the crack growth rate is computed by the following formula.

$$da/dN = C(\Delta J_f)^m \quad \text{Equation 2}$$

This crack growth rate can be considered to be the amount of crack growth for each one of start-up and shutdown, and therefore a sum of the initial crack length assumed and this amount becomes a crack length after one start-up and shutdown. Then the initial crack length is substituted with the amount thus obtained to find a subsequent crack length. By repeating the similar calculation, the crack growth can be predicted. In this case, the life is regarded as a number of start-ups and shutdowns by which the crack length reaches a certain limit length.

When the above-described technique is applied to a practical case, a variation speed of the gas temperature at time of start-up and shutdown, effects of an environment in use, etc. must be considered. To find these data experimentally, it is necessary to conduct a number of experiments and it is often the case that each experiment is difficult to be carried out under conditions embracing the real component conditions. Consequently, in the analytical evaluation of the remaining life according to the present system, the damage is evaluated according to flows shown in FIG. 7. The damage under objective conditions is evaluated, for example, by first evaluating the damage under standard conditions, such as design conditions etc., and then introducing coefficients and indexes representing effects of factors affecting the life as acceleration coefficients of the damage growth rate.

Figure 7:
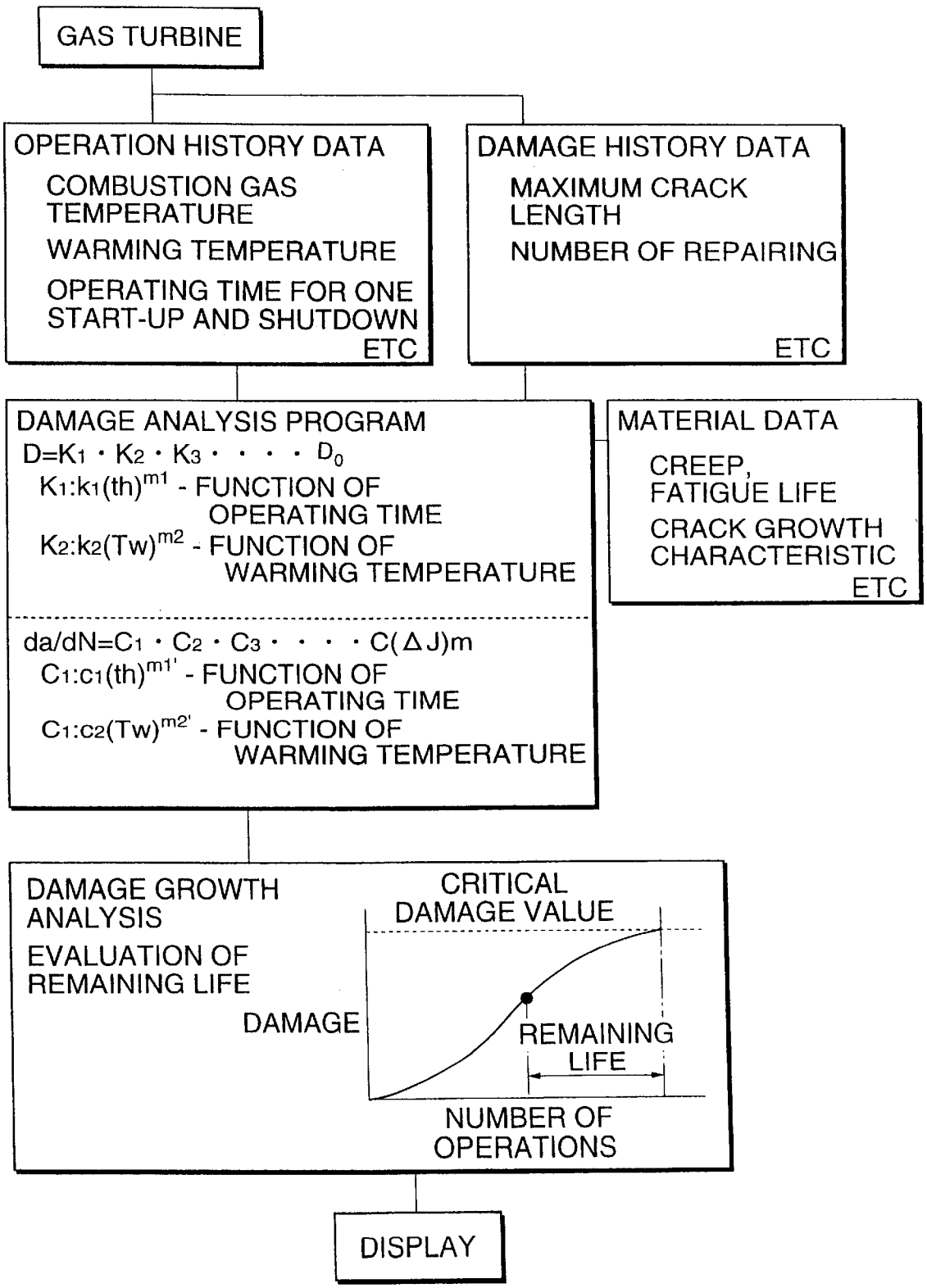
FIG. 7 is a flowchart for the evaluation of the remaining life and the evaluation of the crack growth.

$D_0$ and C, m shown in the damage analysis program of FIG. 7 are damage values or coefficients or indexes of a crack growth characteristic under the standard conditions, and coefficients $K_1$, $K_2$, . . . , $C_1$, $C_2$ are coefficients representing the effects of respective factors. These coefficients are obtained using experimental data, data of the structure analysis performed with varied factors as parameters, and the real component damage data, and stored in the main database 4. Operation history data and damage history data shown in FIG. 7 are transferred from the monitoring device 2 and the maintenance client system 5b to the server system 3. Further, necessary material data are transferred from the main database 4 to the server system 3. The evaluation is performed using these data according to flows shown in FIG. 7.

Figure 8:
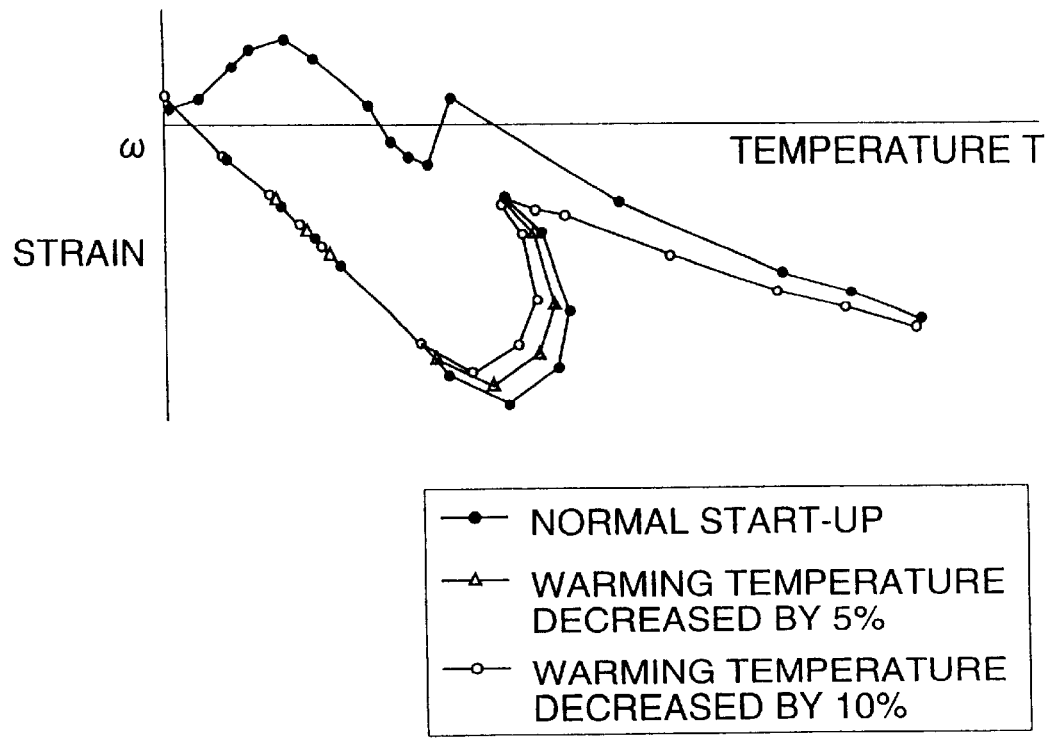
FIG. 8 is a graph showing a temperature-strain. characteristic curve of the first-stage nozzle of the gas turbine under conditions with varied warming temperatures of the gas turbine.

A derivation method of the above-described coefficients $K_1$, $K_2$ . . . , $C_1$, $C_2$ , etc. is explained below. By way of example, FIG. 8 shows results of the structure analysis performed with varied warming temperatures $T_w$. It is expected that decreasing the warming temperature lowers generated strain at time of start-up and delays the crack growth. Based on results of this analysis, the damage growth rate is obtained by the same method as that of the analytical evaluation of the remaining life and a coefficient representing an effect of the warming temperature is evaluated. In practice, in order to associate the coefficient with the real component data, the coefficient is determined in such a manner as shown in FIG. 9.

Figure 9:
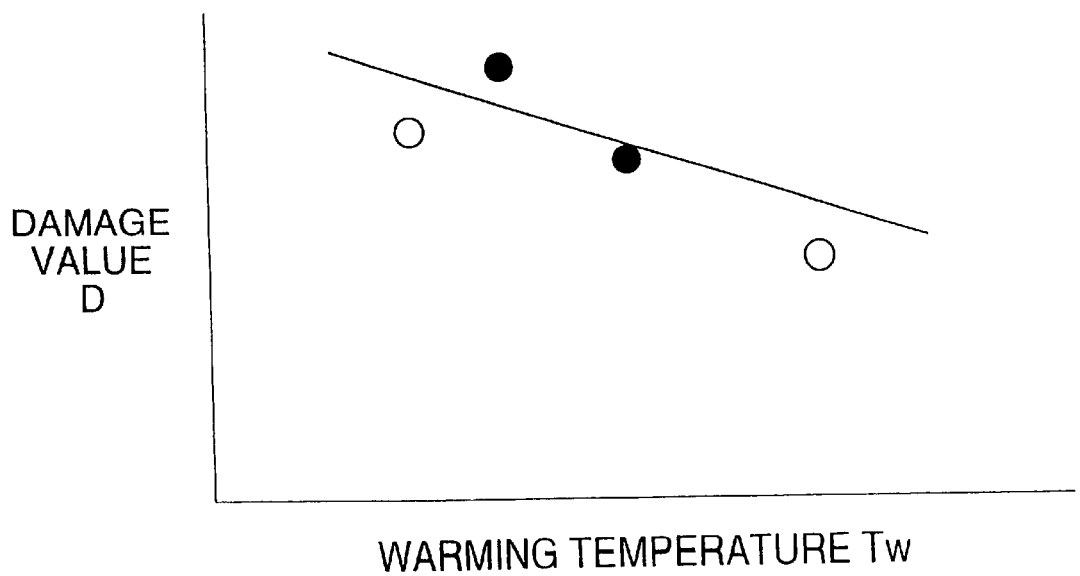
FIG. 9 is a graph showing a relationship between the damage value and the warming temperature in a relationship between the damage of the first-stage nozzle of the gas turbine and the warming temperature.
Figure 10:
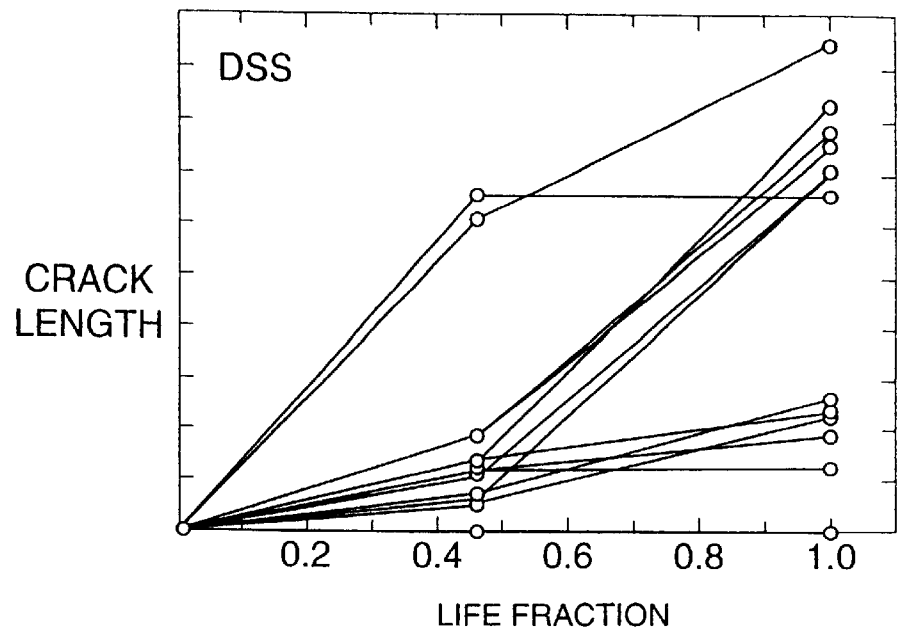
FIG. 10 is a graph showing crack growth behavior of the first-stage nozzle of the gas turbine operated in the DSS mode.
Figure 11:
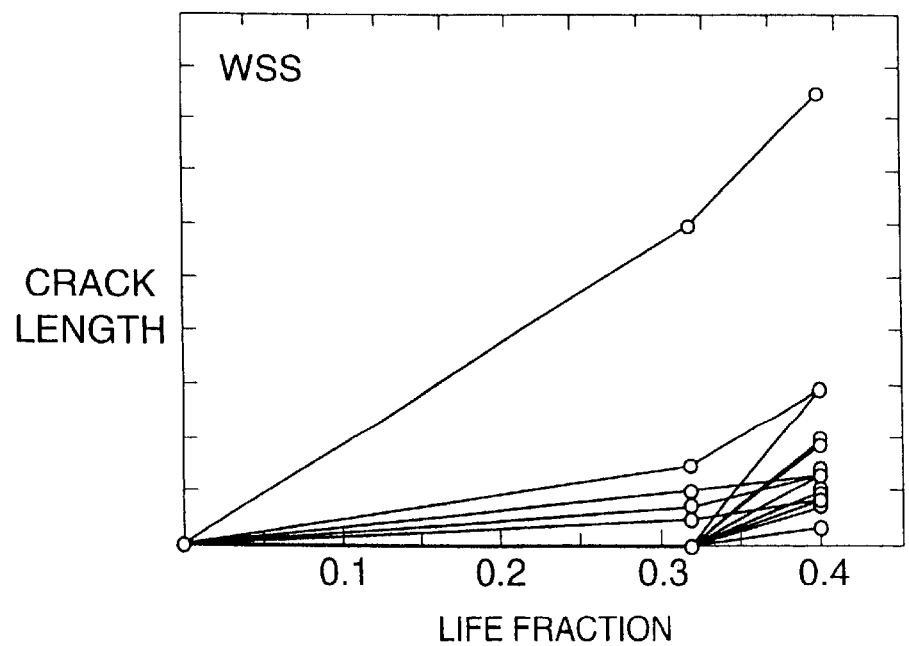
FIG. 11 is a graph showing crack growth behavior of the first-stage nozzle of the gas turbine operated in the WSS mode.

FIG. 9 shows a graph with a horizontal axis for the warming temperature and a vertical axis for the damage value, where a solid line in the figure represents a relationship between the warming temperature and the damage that was obtained by the above-described method (1) or (2) from the result of the structure analysis. In the figure, the damage data obtained for the gas turbine with different warming temperatures are plotted and the results of the analysis are reviewed so that the data thus obtained and the above-described solid line are consistent with each other within a certain rage of error. Regarding the operating time per one start-up and shutdown, behaviors of the damage growth observed in the real component are shown in FIG. 10 and FIG. 11, which indicate that the damage growth considerably depends upon the operating modes, such as DSS, WSS, etc.

Figure 12:
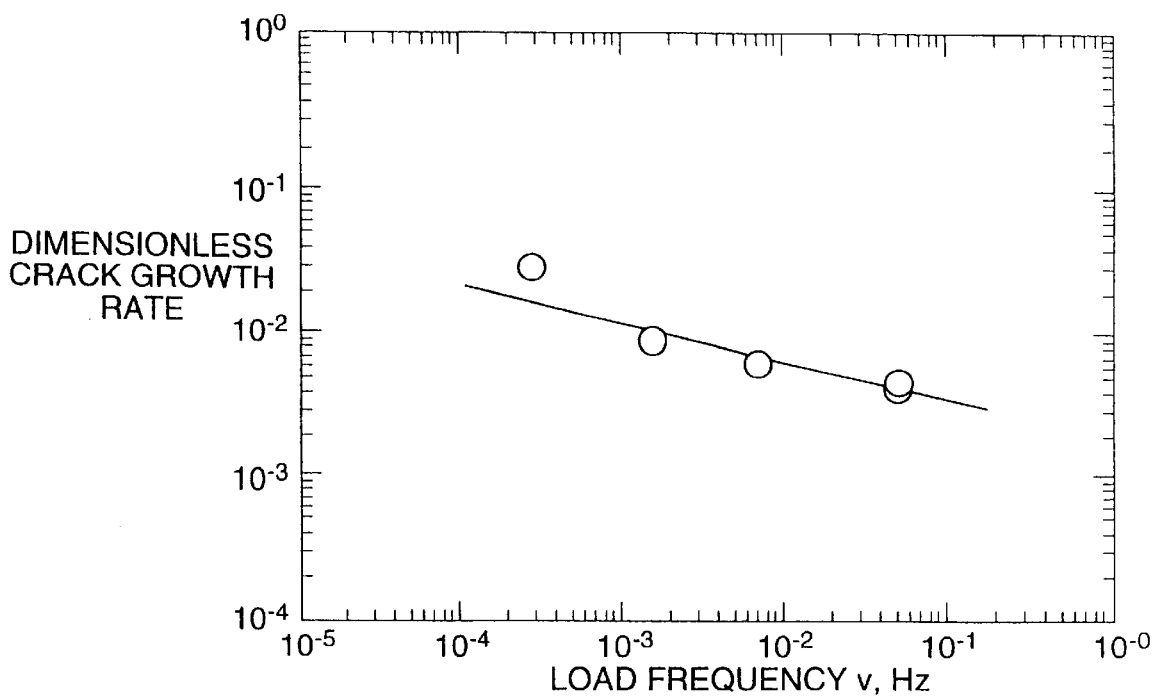
FIG. 12 is a graph showing a relationship between crack growth rate versus loading frequency.
Figure 13:
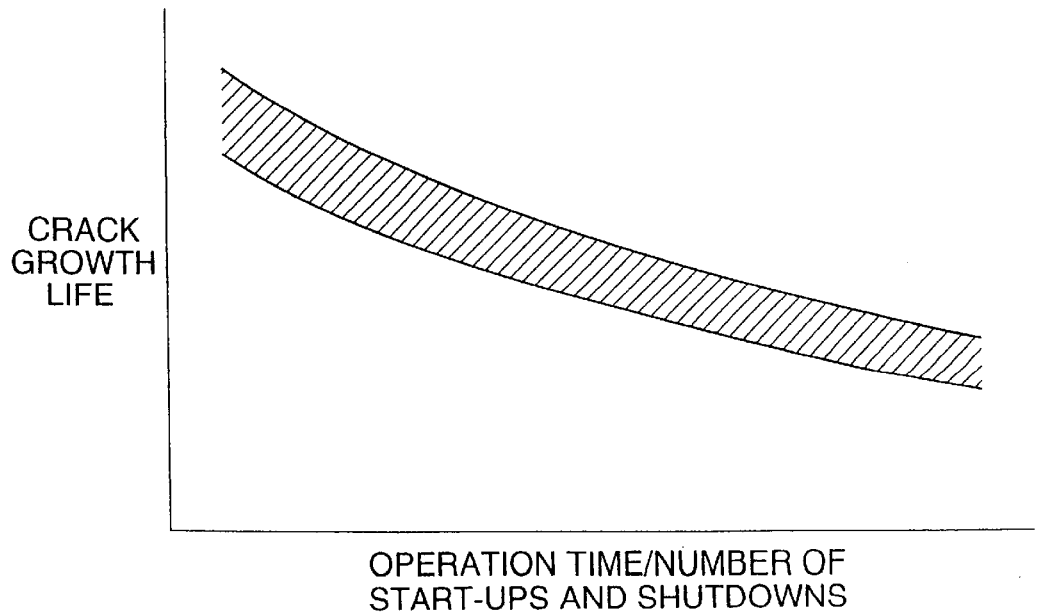
FIG. 13 is a graph showing the effect of operating time per one start-up and shutdown on the life.

From this fact, the effect of the operating time can be presumed in the light of a relationship between the crack growth rate and the loading frequency, for example, shown in FIG. 12. FIG. 12 is obtained from the results of a crack growth test of the nozzle member. Since the loading frequency can be considered as an inverse of the operating time per one start-up and shutdown, reduction of the load frequency means that a period from start-up to shutdown becomes longer. By deriving an approximate equation for these data, a coefficient representing an effect of the operating time can be obtained. The coefficients obtained from FIG. 12 can be applied, as it is, to the above-described damage evaluation method (2); whereas in the case of the method (1), these are applied in a such manner that the relation between the life and the operating time per one start-up and shutdown, as shown in FIG. 13, is obtained from the results of the crack growth analysis using these coefficients and then the relation is formulated.

In practice, since factors other than the warming temperature affect the relation, the real component data plotted in FIG. 9 and FIG. 12 exhibit ensembles with a very large variance. Therefore, with respect to each of all factors that should be considered, the same graph as FIG. 9 is prepared and the regression analysis is performed. That is, data fitting is performed with varied coefficients and indexes included in respective calculating formulas for coefficients of each factor ($k_1$, $m_1$, $c_1$, etc. in FIG. 7), and the coefficients and indexes are determined so that the results of evaluation fall in a certain given range.

Figure 14:
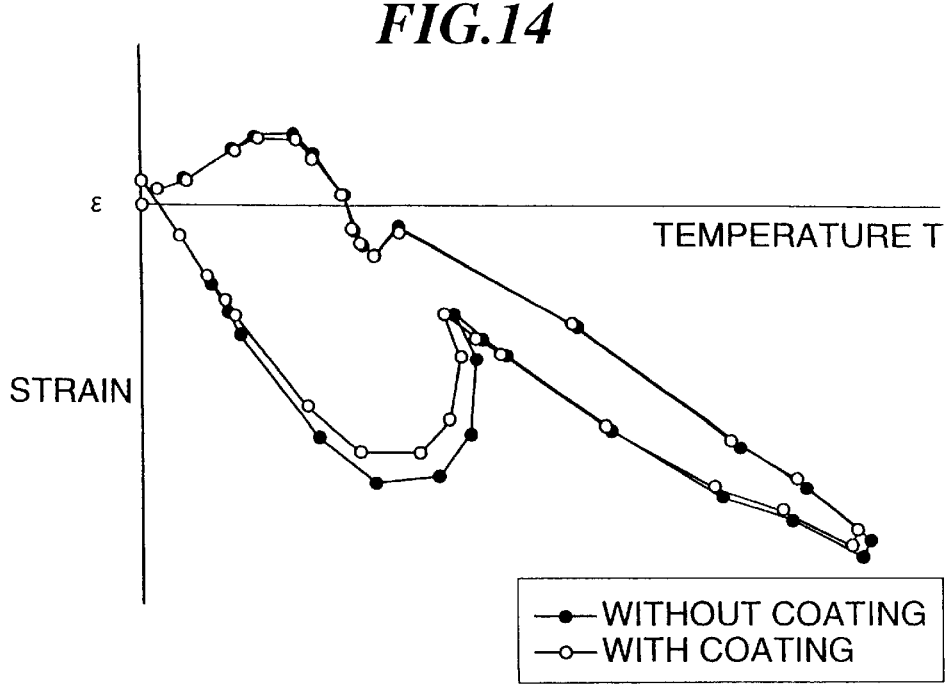
FIG. 14 is a graph showing a characteristic curve of temperature-strain hysteresis of the first-stage nozzle of the gas turbine when conditions of coating application are altered as parameters.
Figure 15:
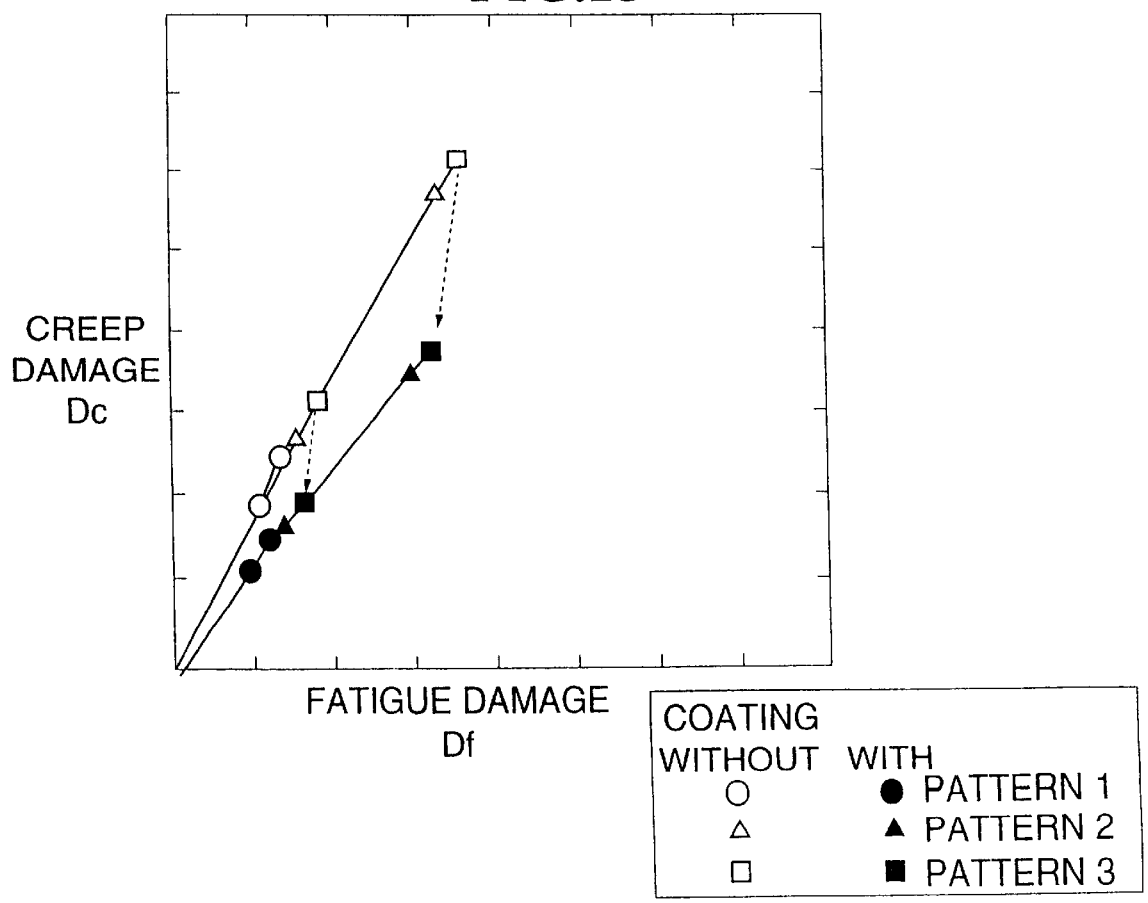
FIG. 15 is a graph showing change of the damage value under conditions of the coating application.

In the foregoing, described is an embodiment for a case where the damage of a part currently in use is evaluated; whereas for a case where the life extension of each part is examined using the present life management system, an embodiment for computing the effect is described below. FIG. 14 shows the results of a case where the thermal stress analysis is performed under the conditions where the thermal shield coating is applied on the member surface and generated stress is found. From the analysis, the coating reduces the member temperature, hence also reducing generated stress. Corresponding to this result, FIG. 15 shows results of the damage evaluation that was performed in according to the evaluation method described above in (1).

The results indicate that the coating application reduces the creep damage to approximately 60% of the initial value. From this result, it is judged whether the coating application should be executed or not in the light of which is significant, the amount of cost reduction by parts life extension achieved by coating or cost increment imposed by coating.

Figure 16:
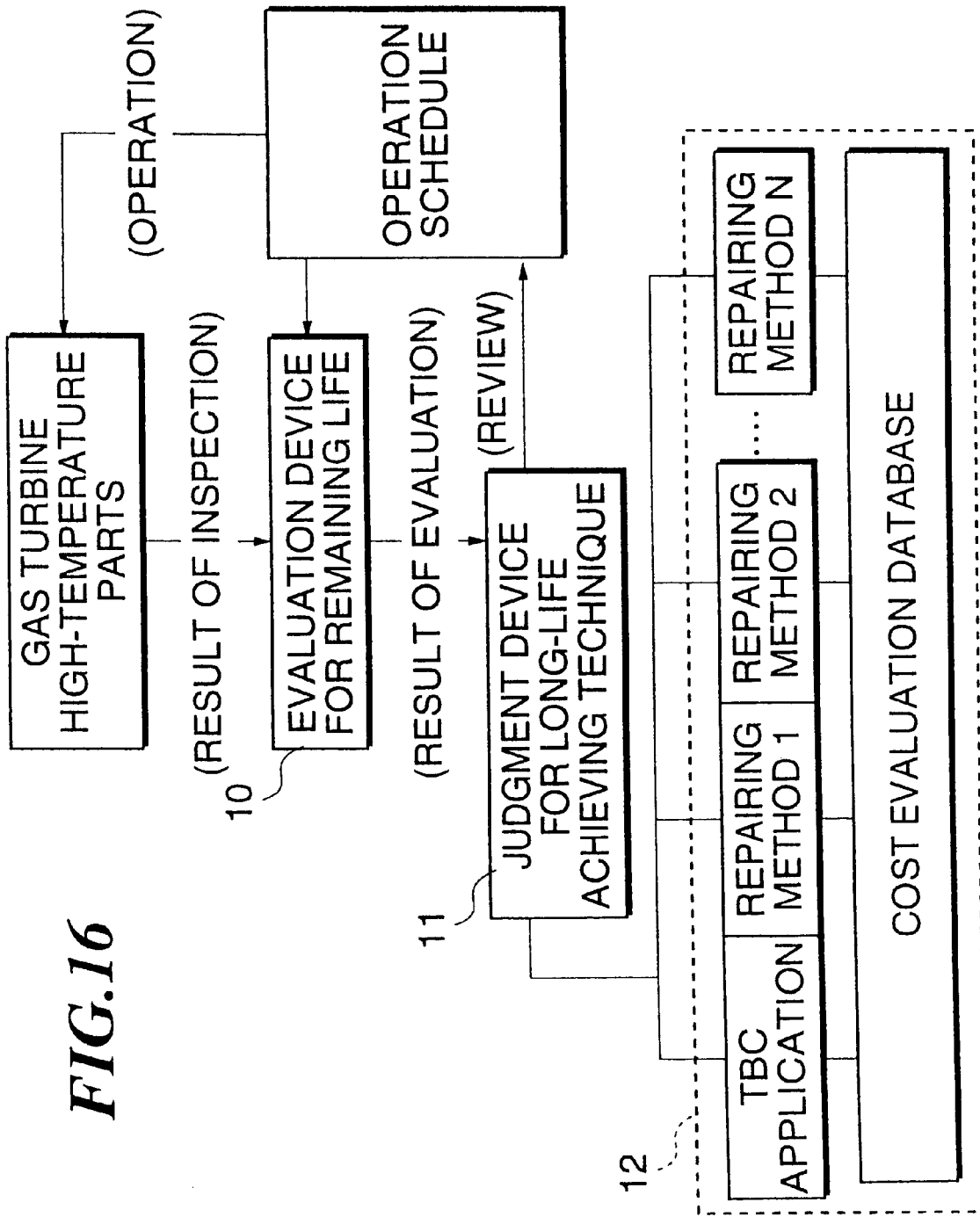
FIG. 16 is a flowchart showing flows for selecting repairing methods in the remaining-life management system according to the present invention.

In practice, not only the coating but also the repairing, alteration of a start-up and shutdown pattern, etc. are considered to be a life extension method. FIG. 16 shows its evaluation flows included in the present system. Flows until the remaining life evaluation device 10 are the same as described above and the evaluation is performed in the server system 3 based on the results of inspection which were entered in the maintenance client system 5b. Based on the results, at a time when the repairing is required, several repairing methods are considered as candidates, and the life extension rate and necessary costs corresponding to a case where one of the candidates and the thermal barrier coating (TBC) are applied are judged by the judgment devise 11 for long-life achieving technique using the database 12 pertaining to repairing methods.

This database 12 and the judgment device 11 are included in the main database 4 and the server system 3. As a result of its judgment, considering also the remaining life at a scheduled time of replacement, a repairing method and a time of repairing that can minimize operational costs per unit time are selected and transferred to the operations management client system 5a, respectively.

Figure 17:
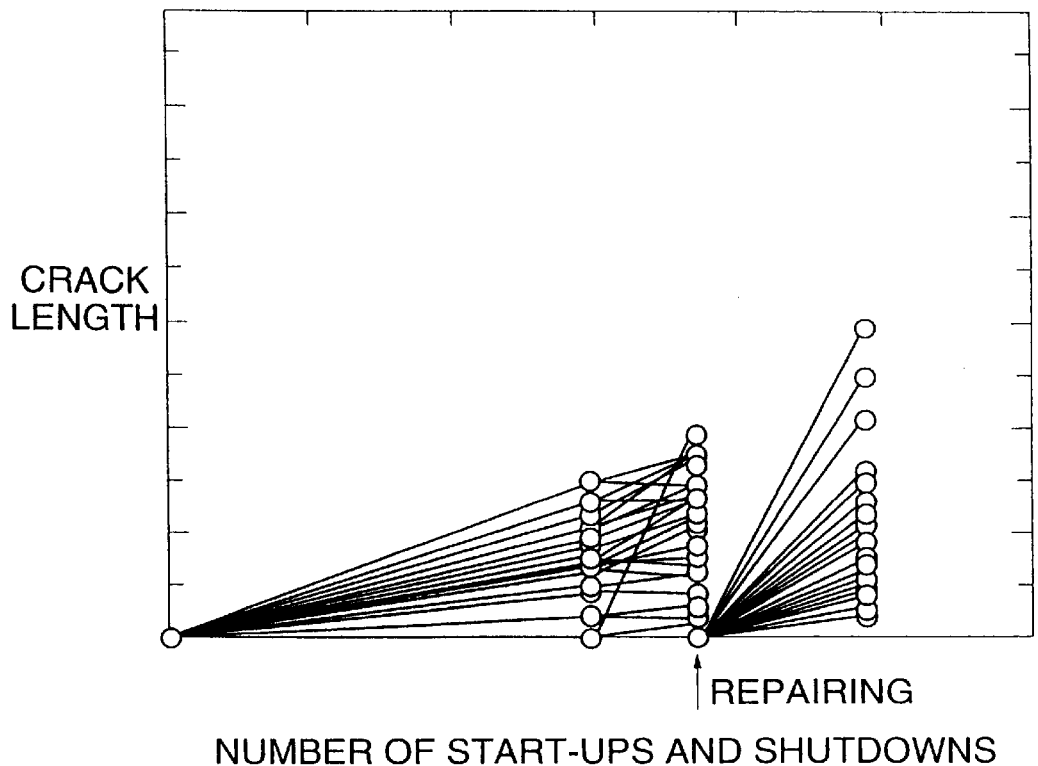
FIG. 17 is a graph showing change of the crack growth behavior before and after the first-stage nozzle of the gas turbine was repaired.
Figure 18:
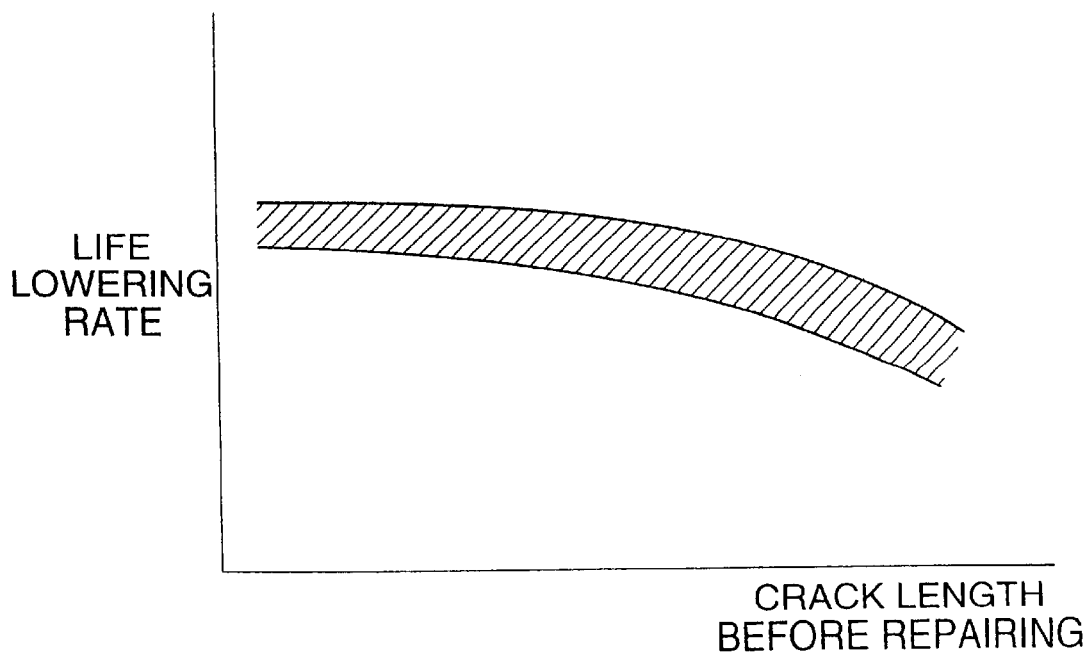
FIG. 18 is a graph showing a relationship between the life-lowering rate after repairing and the crack length before repairing on the first-stage nozzle of the gas turbine.

As for data contained in the database 12 pertaining to repairing methods, there are, for example, damage growth data such as a crack of a repaired member which was used actually in the real component, as shown in FIG. 17, etc. and the life lowering rate of the repaired member obtained experimentally. If modification of the life lowering rate due to repairing does not depend on the amount of repairing, the value is saved as it is; if it depends on the amount of repairing, with intent to simplify the evaluation on and after this procedure, a relationship between the amount of damage, such as a crack length before repairing etc., and the life lowering rate after repairing is saved, as shown in FIG. 18.

Figure 19:
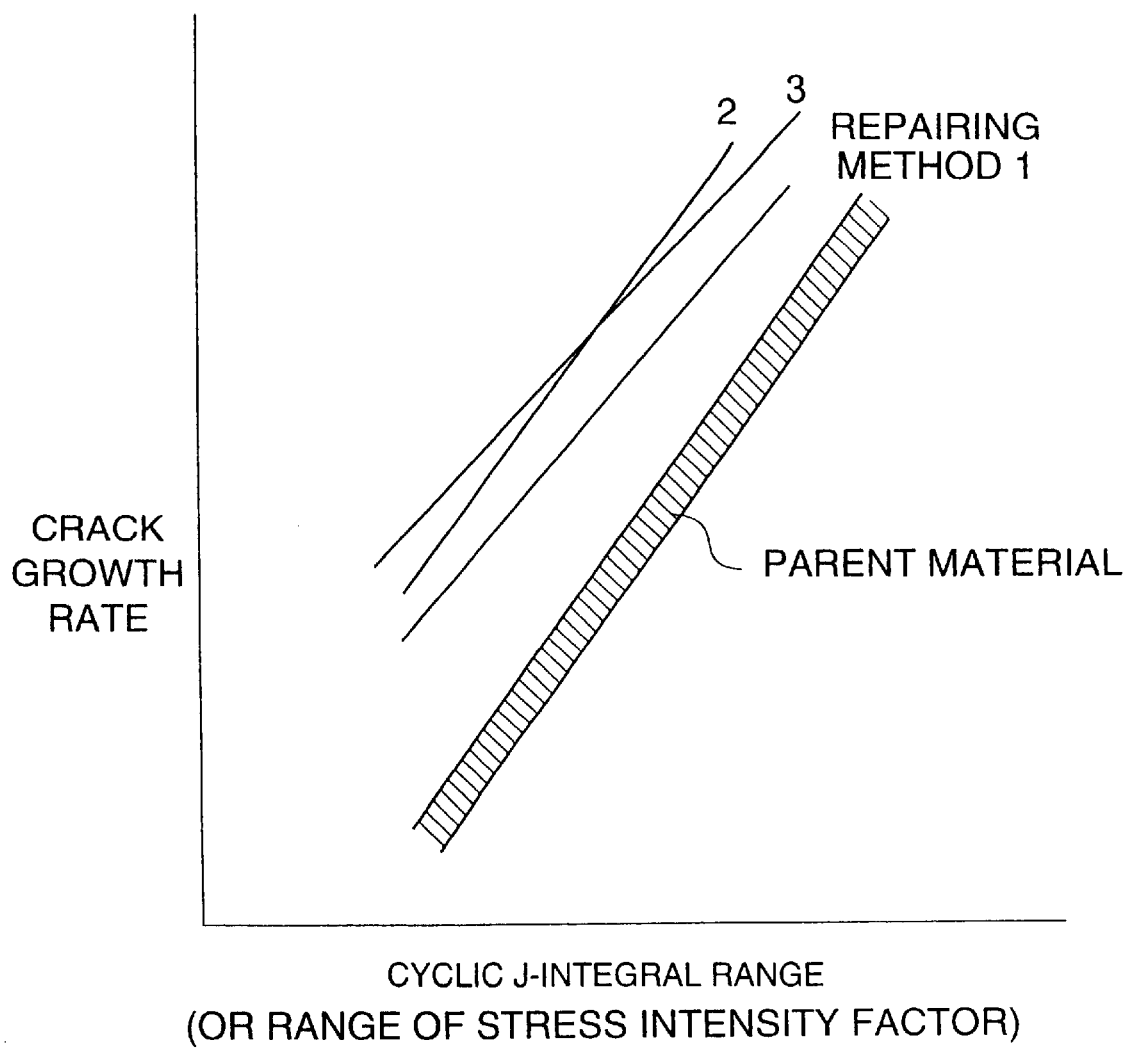
FIG. 19 is a graph showing the crack growth characteristic of repaired members.

Furthermore, as for the crack growth characteristic, relationships between fracture mechanics parameters for respective repairing methods (cyclic J-integral etc.) and the crack growth rate obtained experimentally, as shown in FIG. 19, are saved. By substituting data of the parent member with data of these repaired members and performing the above-described evaluation method (1) or (2), the remaining life of a high-temperature part that was repaired is evaluated.

Figure 20:
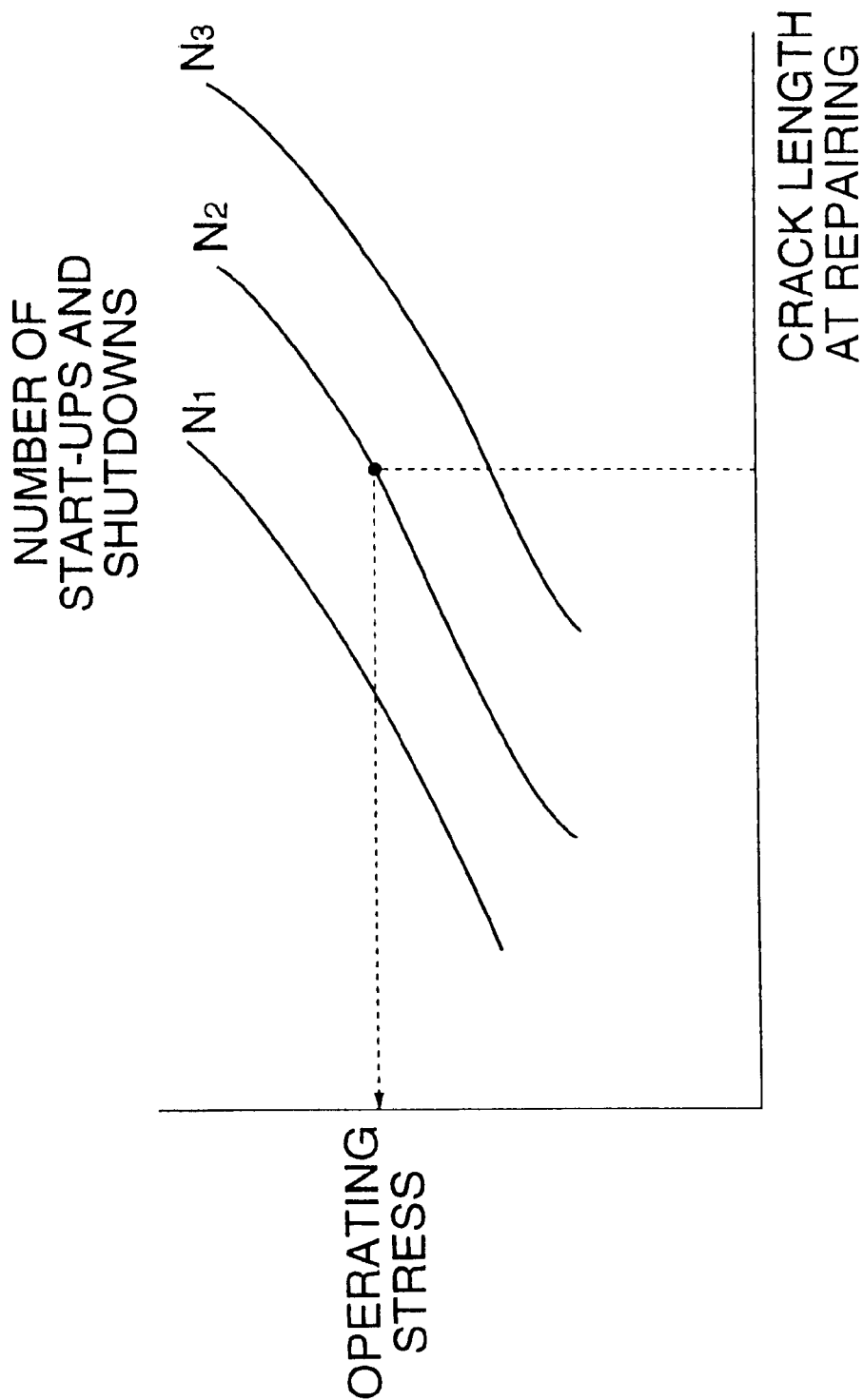
FIG. 20 is a graph showing a relationship between operating stress and the crack length of the first-stage nozzle of the gas turbine before repairing.

As for estimation of a stress value that is necessary in performing evaluation, analysis with varied operating stress is performed beforehand and the results obtained is saved as a relationship between the operating stress and the crack length at the same number of start-ups and shutdowns, as shown in FIG. 20. Then the operating stress is estimated from the crack length at time of repairing. This procedure is taken to enable a simple and easy evaluation by obtaining such relationships separately, because it is realistically impossible to consider the variance of the damages for each one of parts mounted on the real component.

Figure 21:
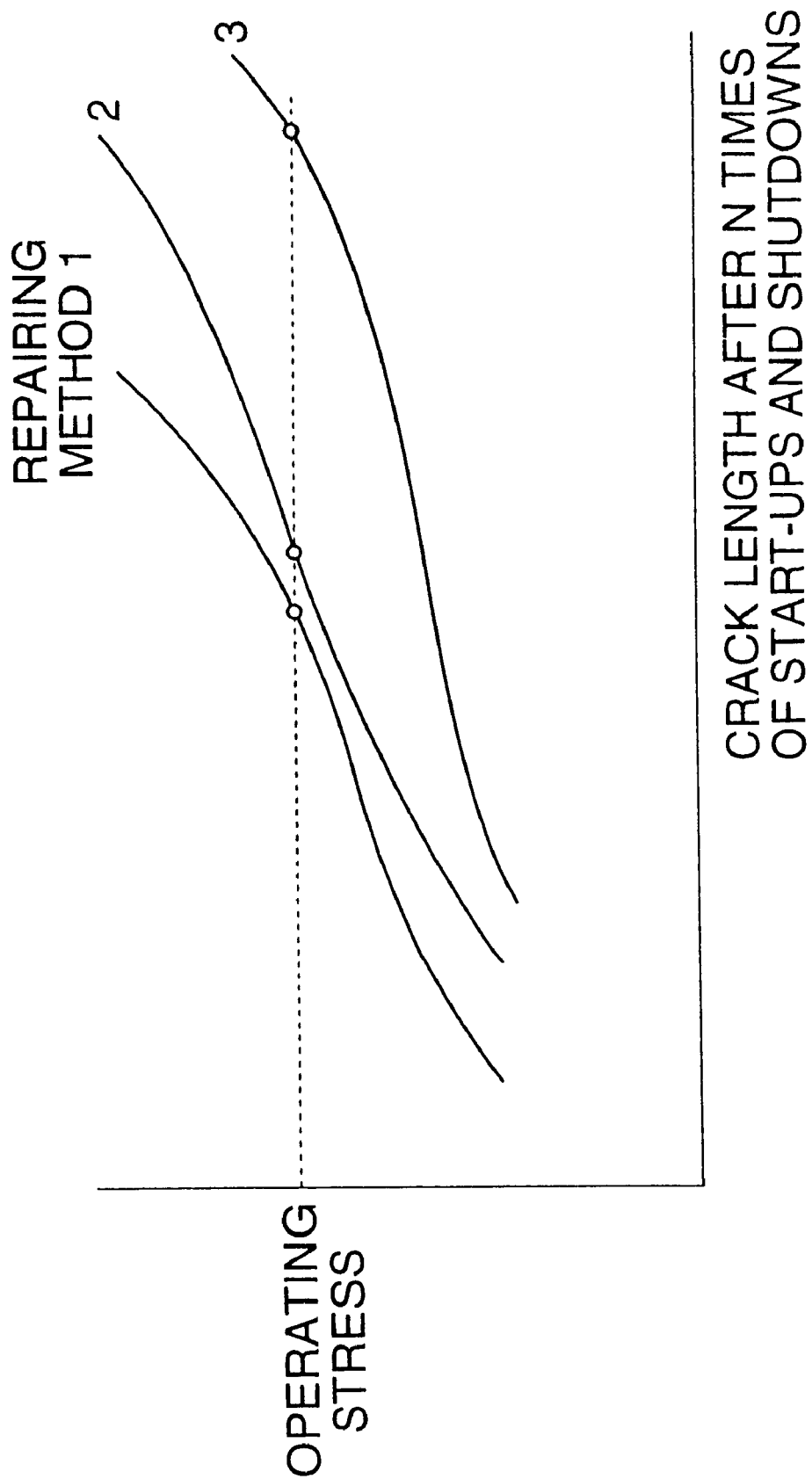
FIG. 21 is a graph showing the difference of the crack lengths of the first-stage nozzle of the gas turbine dependent on repairing methods.

The operating stress thus estimated is used for the crack growth analysis after repairing. FIG. 21 shows its evaluation method, in which how the crack length will change by the operating stress after the number of start-ups and shutdowns that are scheduled just after repairing until a next regular inspection or replacement is obtained by performing the crack growth analysis using the relationship of FIG. 19. By providing the operating stress obtained in FIG. 20 to this finding, the amount of the crack growth when each repairing method is applied is estimated. From the results, which repairing method should be applied is judged.

Figure 22:
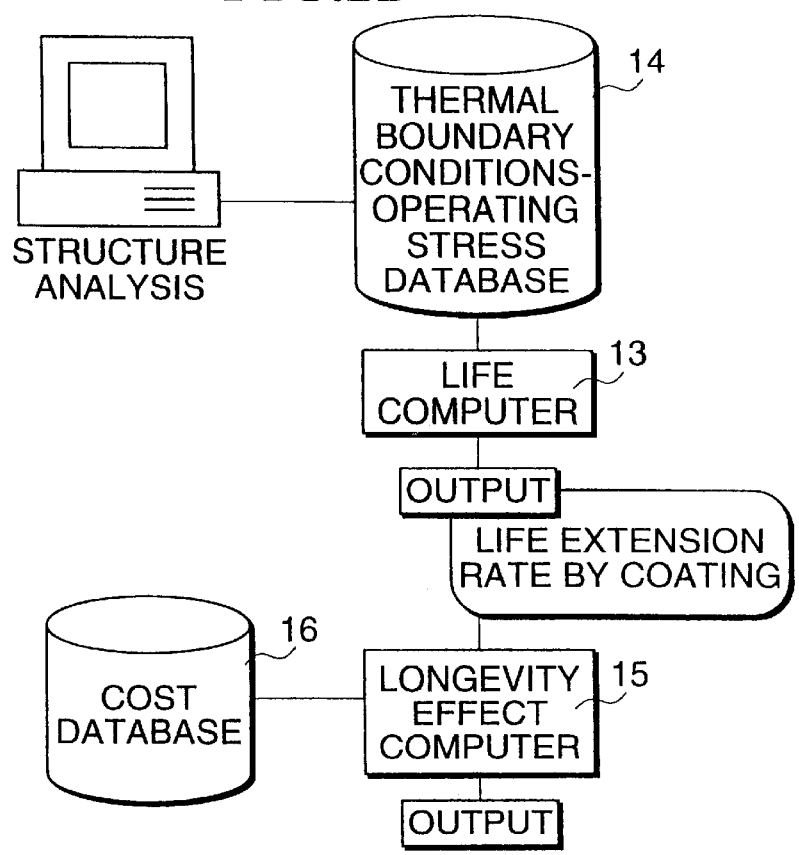
FIG. 22 is a flowchart for evaluating the effect of the coating application on the first-stage nozzle of the gas turbine.

The effect of the coating application is evaluated in different flows from that of repairing, as shown in FIG. 22, because the temperature of a member after the coating application is varied from the initial value. The life computer 13 is a device for performing similar arithmetic execution as a damage analysis program of FIG. 7. Data to be entered to the life computer 13 are provided from the database 14 whose data were formed based on the results of the structure analysis with varied thermal boundary conditions. This database 14 is composed of the results of the structure analysis performed by the design client system 5c and is stored in the main database 4 through the server system 3. The life evaluation is executed by the server system 3 and its results are displayed as the life extension rate. Considering the costs as well this, a time of coating application and a part to be applied with coating that minimize the operational costs per unit time are determined in the same manner as of the case of repairing.

Since, in the structural analysis for computing the data to be entered to the thermal boundary condition-operating stress database 14, it takes a considerable time to perform the structure analysis actually by modeling a extremely thin coating layer on the member surface, the thermal shield effect of the coating is substituted with the change of the heat transfer coefficient to perform the computation by the following method.

Figure 23:
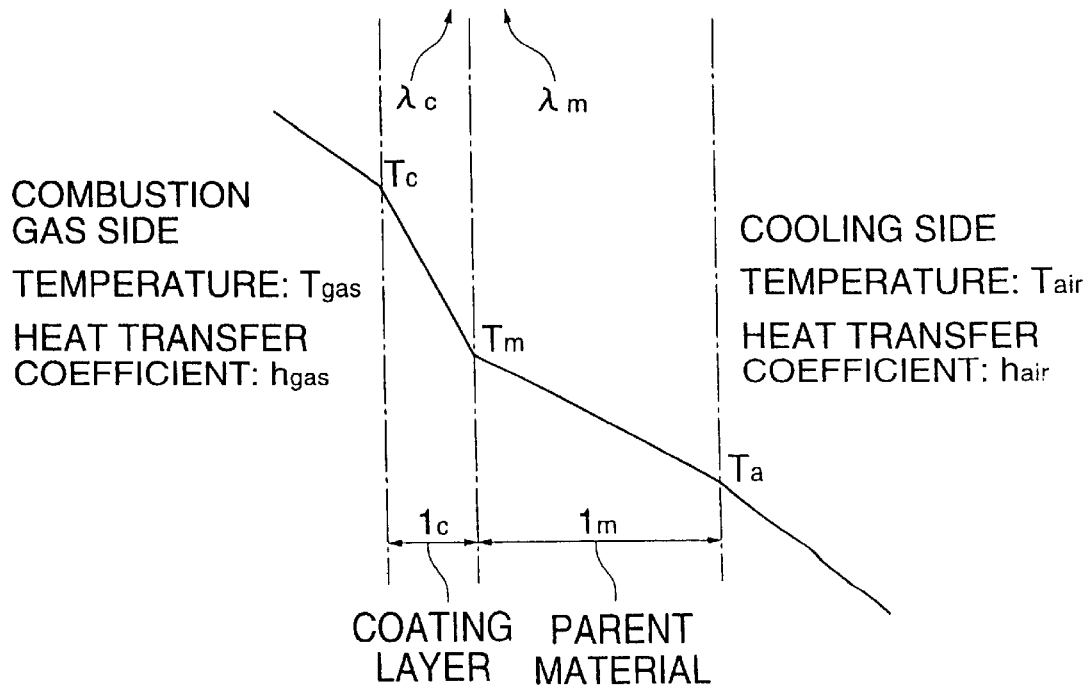
FIG. 23 is a cross section of a member on which coating was applied.

FIG. 23 shows a typical diagram of the cross section of the coating member. From the heat conduction calculation, the heating value passing through the cross section is given in the following formula.

$$Q = \frac{1}{\left(\frac{1}{h_{gas}} + \frac{l_c}{\lambda_c}\right)}(T_{gas} - Tm) \qquad \text{Equation 3}$$

Symbols $l_c$ and $\lambda_c$ are the thickness and the thermal conductivity of the coating layer, respectively. From this formula, the coating layer can be treated as a heat transfer boundary equivalent thereto by the following formula.

$$\frac{1}{h'} = \frac{1}{h_{gas}} + \frac{l_c}{\lambda_c} \qquad \text{Equation 4}$$

Figure 24:
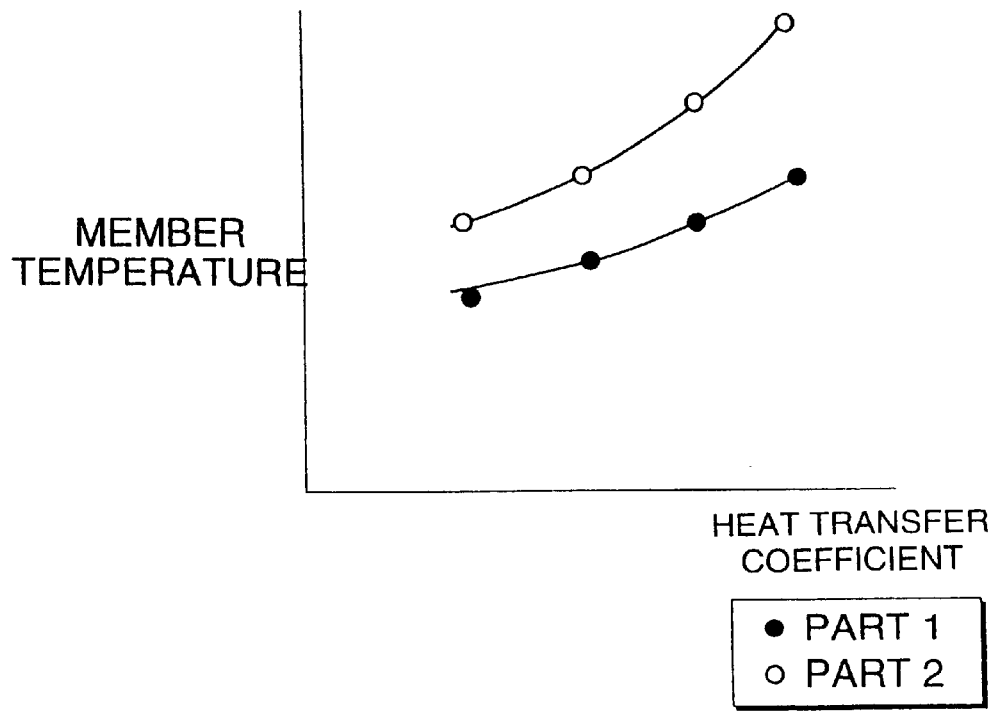
FIG. 24 is a graph showing a relationship between the member temperature of the first-stage nozzle of the gas turbine and the thermal conductivity the high-temperature side.
Figure 25:
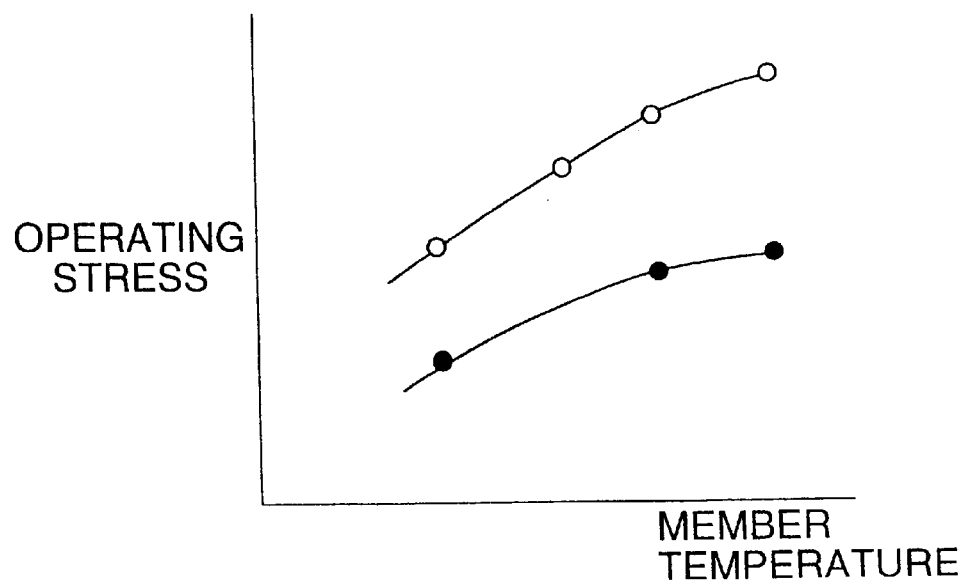
FIG. 25 is a graph showing a relationship between the operating stress of the first-stage nozzle of the gas turbine and the member temperature.

A symbol h' that can be obtained by changing $l_c$ and $\lambda_c$ appropriately is used to perform the thermal stress analysis, and the effect of the coating on the generated stress is evaluated by the structure analysis. The results are saved in the database 14, as shown in FIG. 24 and FIG. 25, in the form of the relationship between the member temperature and the heat transfer coefficient and the relationship between the operating stress and the member temperature. These relationships differ depending on a part, and therefore data are accumulated for every part where the evaluation is necessary.

Figure 26:
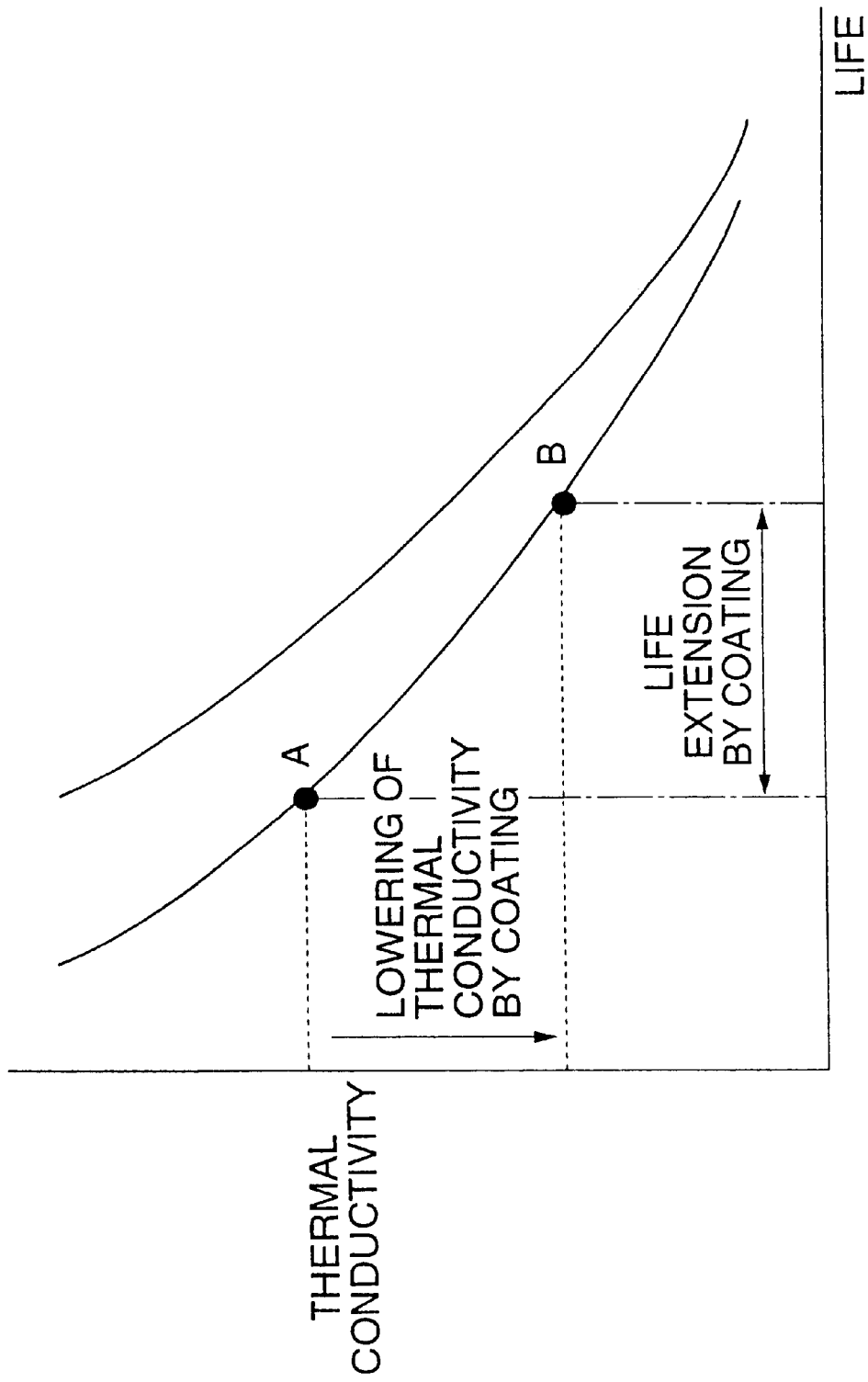
FIG. 26 is a graph showing a relationship between the life and the thermal conductivity of the first-stage nozzle of the gas turbine, which is used to evaluate the life extension rate dependent on the change of the thermal conductivity.

On the basis of these relationships, the crack growth analysis when the operating stress decreases is performed with the above-described evaluation method (2), the relationship between the crack growth life thus obtained and the heat transfer coefficient is obtained for each part beforehand as shown in FIG. 26, and the life extension rate by coating is evaluated by using this relationship.

Figure 27A:
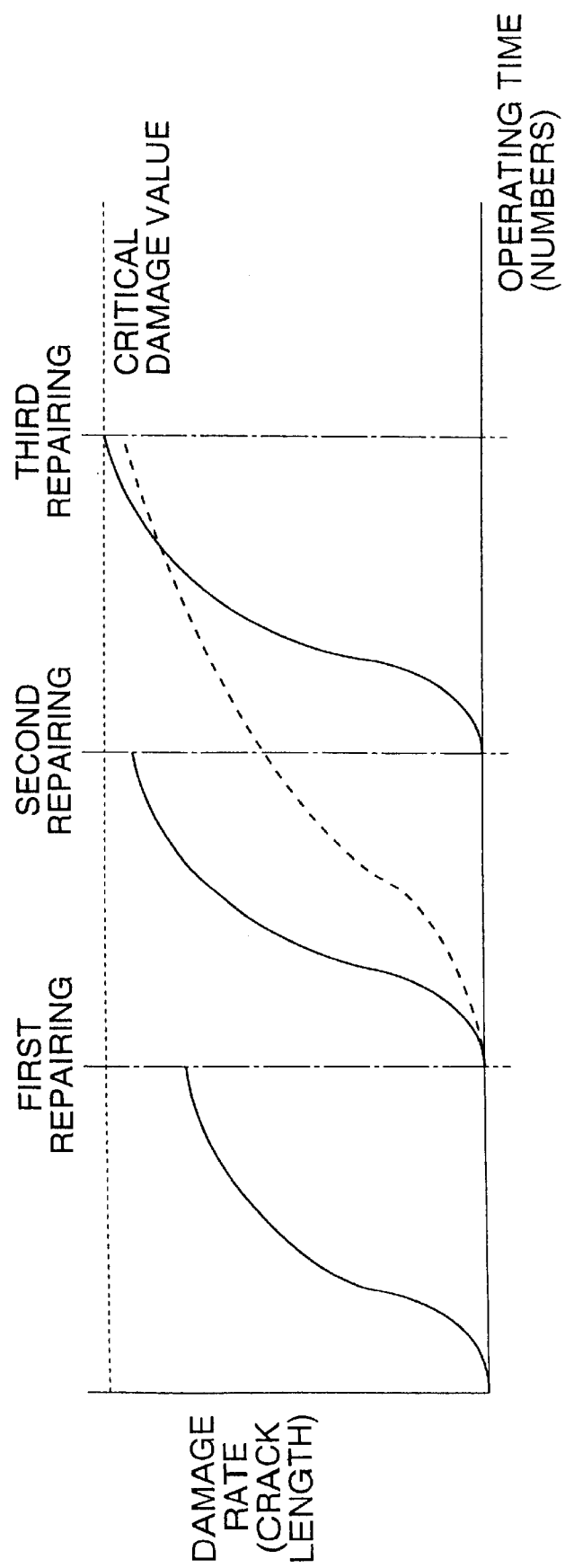
FIG. 27 is a graph showing an example of evaluation of an optimal time for coating application and repairing for the first-stage nozzle of the gas turbine.
Figure 27B:
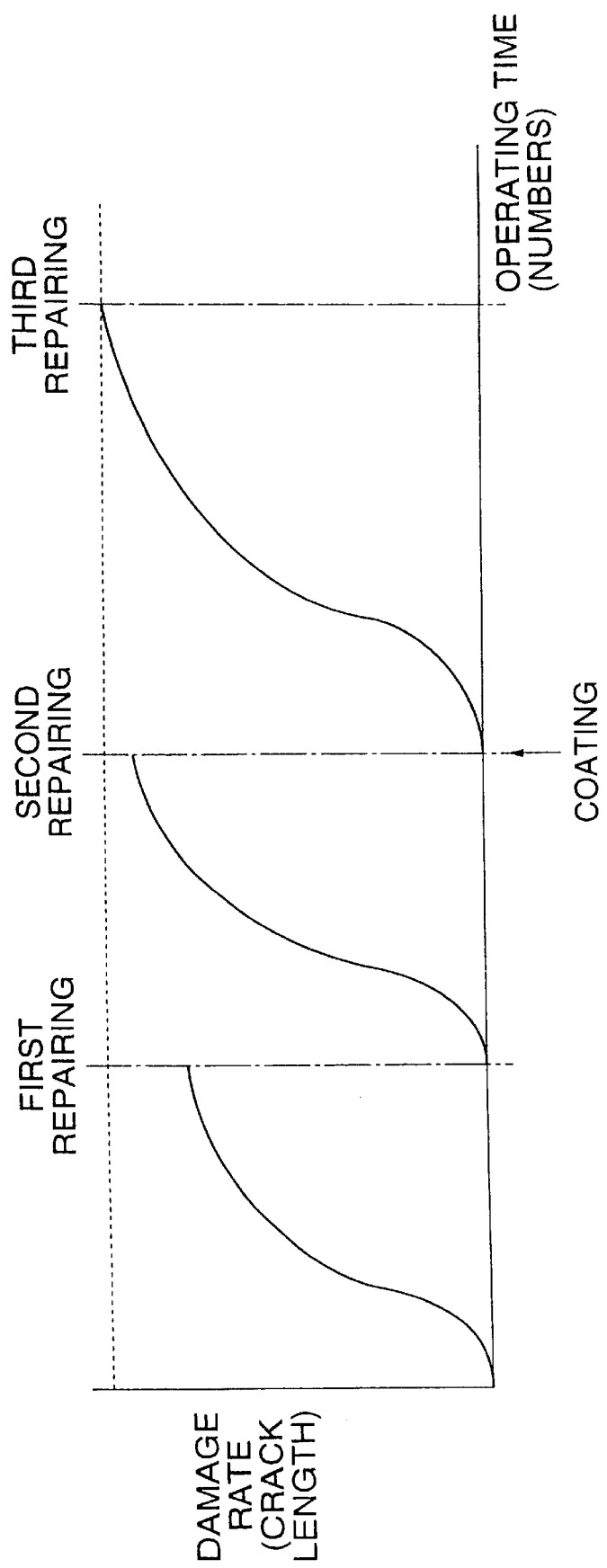
Figure 27C:
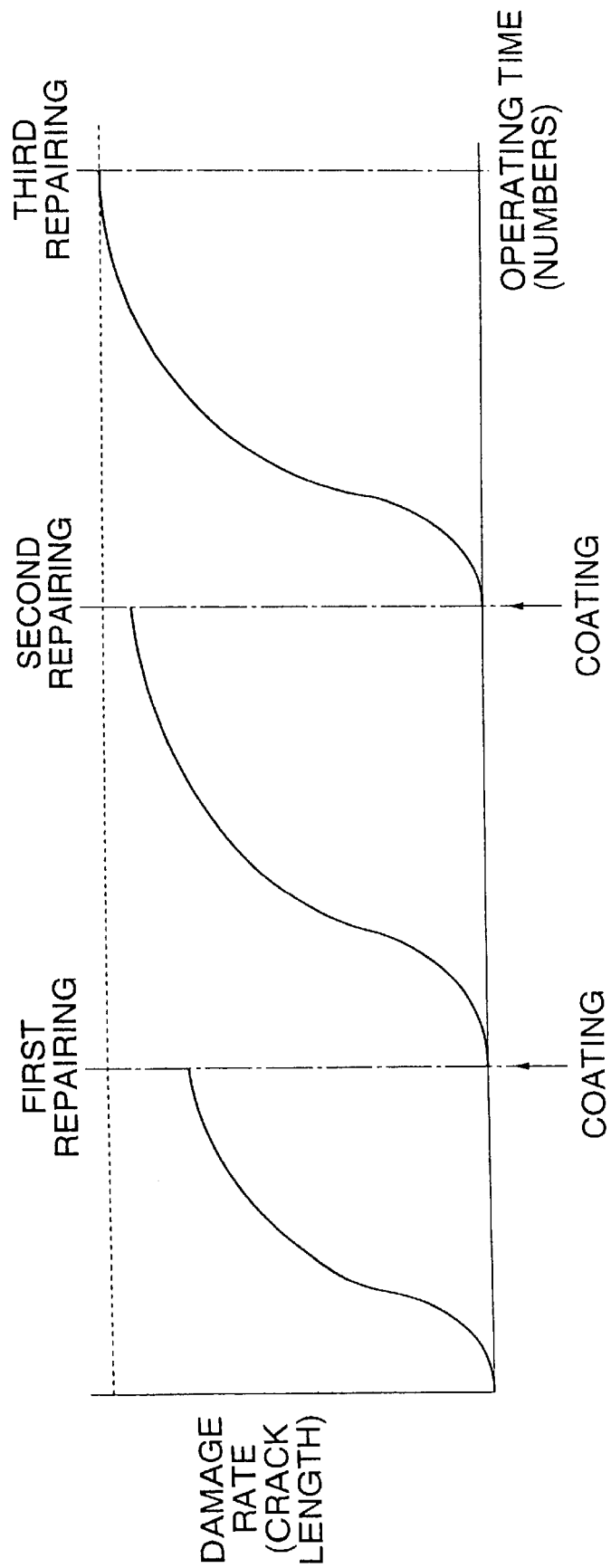

Considering the evaluation of the life extension rate mentioned above as well as the costs, it is judged whether the coating application is effective or not. A computer 15 for that purpose also exists in the server system 3, which performs the evaluation by obtaining the data from the costs database 16 recorded in the main database 4. An example of its evaluation is shown in FIG. 27. By the way, as for the selection of a repairing method, the evaluation is performed based on the same idea as in FIG. 27. When the gas turbine is put into operation with a given interval of repairing, if the damage values such as the crack etc. are estimated not to exceed the limit values in each period of time from repairing to repairing as in FIG. 27(a), it is judged that the coating is unnecessary. However, if it is estimated that the life can be secured without applying the repairing one time by virtue of the life extension achieved by coating as shown by the broken line, a content indicating this is displayed.

If the interval of the repairing is fixed, the evaluation is completed with this. If the interval is alterable, the damage growth analysis for a case where the coating is applied at the scheduled time of repairing is performed, as shown in FIG. 27 (b)(c), and an optimal time of repairing under the conditions is found. In practice, similar analysis for cases where different repairing methods are applied is performed, so that damage growth curves shown in FIG. 27 become available for all operation schedules considerable.

From these results, the total cost is calculated by summing the costs necessary for repairing and coating and the remaining life at time of replacement that is converted into a cost, and the total cost is divided by the operating time to find a total cost per unit time. Several operational schedules are provided in ascending order of the total cost per unit time, so that an operations manager of the gas turbine now judges which schedule to adopt based on it.

Figure 28:
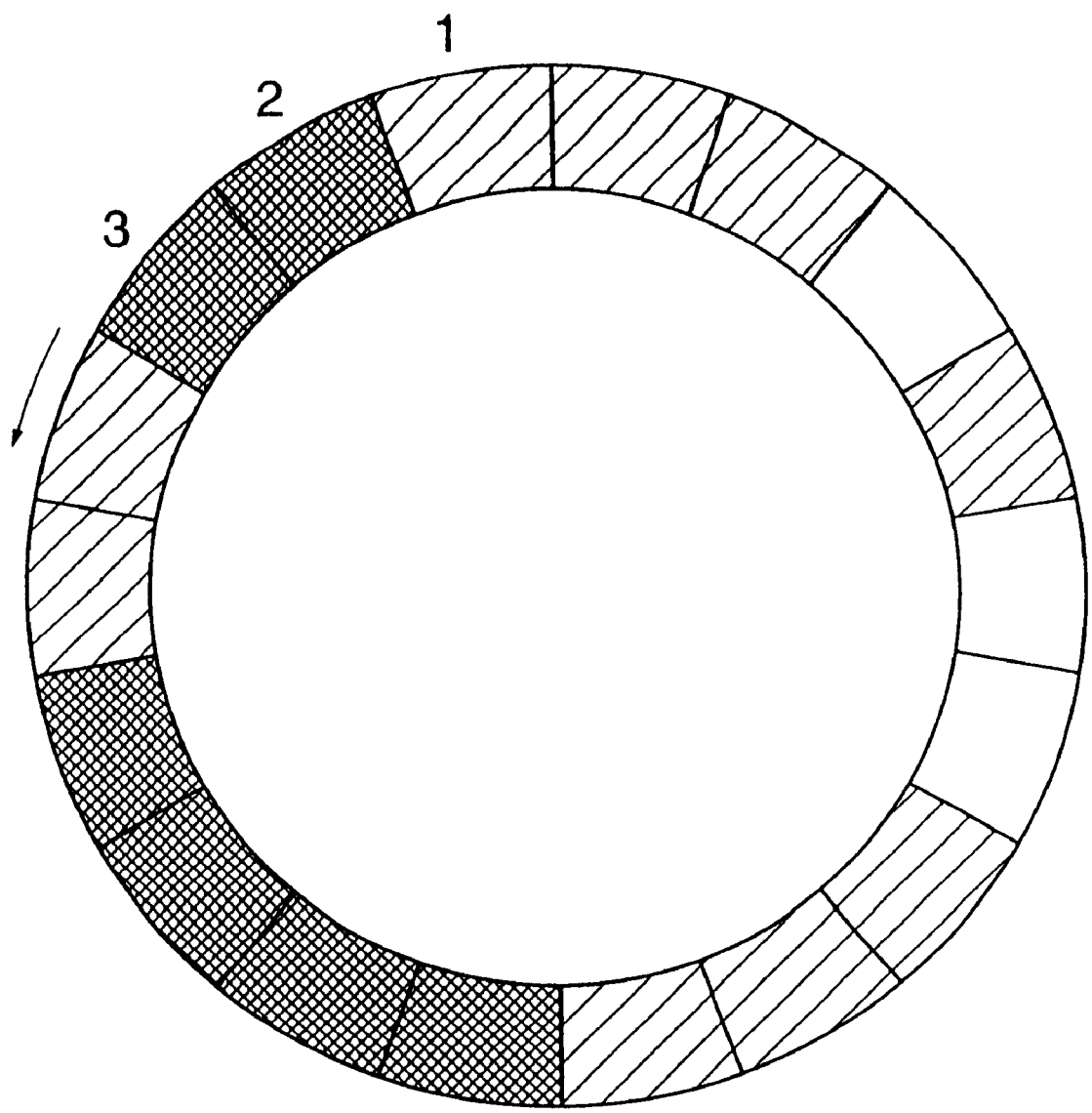
FIG. 28 is a diagram showing an indication example of damage distribution in the nozzle ring of the gas turbine.

In a real component, a plurality of the same parts are used in a single gas turbine simultaneously and their damage growth rates may vary. Therefore, the damage inspection is performed for all parts and their data are collected. The results, for example in the nozzle, are displayed as a ring distribution diagram as shown in FIG. 28, which corresponds to an actual arrangement diagram of the parts, wherein the damage of each part is indicated with a color or a numeral according to its degree. In this diagram, a part light-colored corresponds to a part having non-serious damage; whereas a part dark-colored corresponds to a part having serious damage, and darker the color more serious the damage.

Further, a predicted damage value after being operated for a certain period is also displayed in this diagram and a part that needs the repairing and the coating application is displayed with a time for these (not shown in FIG. 28). Based on this result, parts to be repaired or the like are specified. This procedure decreases the amount of work necessary at time of repairing, hence contributing to cost reduction.

If this life management system is adopted, a period necessary for the evaluation can be cut down, because each element data necessary for the evaluation of the remaining life, such as real component damage, design, materials, etc., are shared among different clients dedicated to different purposes. Further, operations now can be optimized based on the damage of the parts that are evaluated, hence contributing to operational cost reduction.

INDUSTRIAL APPLICABILITY

The life management system according to the present invention finds, as a field of utilization, the life management of high-temperature parts of the gas turbine.

What is claimed is:

1. A life management system for high-temperature parts of a gas turbine which manages lives of parts composing the gas turbine and being arranged in a channel of combustion gas thereof, wherein:

the life management system comprises client systems, each of which is dedicated for each one of operations management, maintenance, design, and material data of the gas turbine; and a server system that integrates these client systems and manages a database for a whole system;

wherein each of the client systems is set to have a function for performing access and entering data to the database, the server system saves a program for performing analysis necessary for the life management, and each of the client systems and the server system are connected via an Intranet.

2. A life management system for high-temperature parts of a gas turbine according to claim 1, wherein the life management system is equipped with means comprising:

a device for monitoring an operation pattern of the gas turbine;

a database for storing relationships between the operating parameters of the gas turbine and damage or damage growth rate of the parts of the gas turbine; and a computer for analytically predicting the damage growth of the parts from the monitored operation pattern, wherein the means computes coefficients and indexes representing effects of the operating parameters on the damage growth rate according to both damage data of the parts and operation history of the gas turbine, performs arithmetic execution by applying these as acceleration coefficients for the damage growth to the damage growth analysis that is executed by the computer, and computes and displays damages and the remaining lives of the parts or the amount of damage at time of next inspection.

3. A life management system for high-temperature parts of a gas turbine according to claim 2, wherein the parts damage database of the gas turbine stores coefficients and indexes representing the lives or the crack growth rates of parts under the operating parameters of the gas turbine through the regression analysis using the relationship between the number of start-ups and shutdowns and the damage of the part in the gas turbine under different operating conditions, and these coefficients and indexes can be freely fetched and used when evaluating the damage.

4. A life management system for high-temperature parts of a gas turbine according to claim 2, wherein the life management system is equipped with means for computing the life extension rate of each part by analyzing sensitivity of the crack growth to alterable operating parameters; and means for computing alteration of operating parameters or alteration of operation schedule that minimizes the remaining life at a scheduled time of parts replacement for a given operation schedule.

5. A life management system for high-temperature parts of a gas turbine according to claim 2, nwherein the parts damage database of the gas turbine stores coefficients and indexes representing effects of each of the operating parameters on the part life or the crack growth rate that was obtained beforehand by analyzing the damage growth of the part based on changes of operating stress exerting on the parts of the gas turbine, strain, and the temperature when each operating parameter is altered, and these data can be freely fetched and used when evaluating the damage.

6. A life management system for high-temperature parts of a gas turbine according to claim 2, wherein the life management system has a database pertaining to repairing methods corresponding to damage occurring in a part in use as well as the life extension rate and costs when one of these repairing methods is applied, and means for judging a repairing method that satisfies requirements concerning a given operation schedule and costs corresponding to the damages of the parts of the gas turbine using the data of the database.

7. A life management system for high-temperature parts of a gas turbine according to claim 2, wherein the life management system is equipped with means for obtaining a relationship between a time of inspection of the part of the gas turbine and the damage of the part with a computer for analyzing the crack growth and judging and displaying a time of inspection that minimizes a cost per unit operating time by using the life extension rate when the relationship and each repairing method are applied, and a database pertaining to costs.

8. A life management system for high-temperature parts of a gas turbine which manages lives of parts composing the gas turbine and being arranged in a channel of combustion gas thereof, wherein:

the life management system comprises client systems, each of which is dedicated for each one of operations management, maintenance, design, and material data of the gas turbine; and a server system that integrates these client systems and manages a database for a whole system; wherein each of the client systems is set to have a function for performing access and entering data to the database, the server system saves a program for performing analysis necessary for the life management, and each of the client systems and the server system are connected via an Intranet, wherein the life management system is equipped with means comprising:

a device for monitoring an operation pattern of the gas turbine;

a database for storing relationships between the operating parameters of the gas turbine and damage or damage growth rate of the parts of the gas turbine; and a computer for analytically predicting the damage growth of the parts from the monitored operation pattern, wherein the means computes coefficients and indexes representing effects of the operating parameters on the damage growth rate according to both damage data of the parts and operation history of the gas turbine, performs arithmetic execution by applying these as acceleration coefficients for the damage growth to the damage growth analysis that is executed by the computer, and computes and displays damages and the remaining lives of the parts or the amount of damage at time of next inspection, wherein the life management system has a database pertaining to repairing methods corresponding to damage occurring in a part in use as well as the life extension rate and costs when one of these repairing methods is applied, and means for judging a repairing method that satisfies requirements concerning a given operation schedule and costs corresponding to the damages of the parts of the gas turbine using the data of the database, and wherein the life management system has either of means for judging whether a cost per unit operating time is reduced by applying the thermal barrier coating and means for finding a time of coating application that reduces the cost, both means being driven with the use of a group of data comprising:

data of the amount of reduction of the stress versus the temperature when thermal shield coating is applied on a member surface of the part of the gas turbine that is obtained through the structure analysis with varied thermal boundary conditions;

data of a life extension rate attained by the thermal barrier coating that is obtained through the damage growth analysis based on the amount of reduction of the stress; and data of costs pertaining to the thermal shield coating.

9. A life management system for high-temperature parts of a gas turbine according to claim 6, wherein the database is a database for storing, as data, a relationship between the damage before repairing, which was obtained experimentally or through the damage growth analysis, and the life lowering rate after repairing, wherein the data can be fetched freely from the database as data to be used in performing the life management of the part.

10. A life management system for high-temperature parts of a gas turbine according to claim 8, wherein the database is a database for storing, as data, relationships between thermal boundary conditions, such as the heat transfer coefficient, the boundary temperature, etc., and induced stress and the lives of members parts, that was obtained by performing the structure analysis after substituting the thermal shield effect of the thermal barrier coating with a change of the thermal conductivity, wherein the data can be fetched freely from the database as data to be used in performing the life management of the part.

11. A life management system for high-temperature parts of a gas turbine according to claim 1, wherein the life management system is equipped with means for displaying an arrangement diagram of the parts of the gas turbine, at the same time displaying the damage and the remaining life of each part on the arrangement diagram, and further judging and displaying importance of the damage investigation of each part from forecasted damage at a scheduled time of a next inspection according to a criterion given beforehand.

* * * * *